US012014509B2

(12) United States Patent
Lee et al.

(10) Patent No.: US 12,014,509 B2
(45) Date of Patent: Jun. 18, 2024

(54) OPTICAL DEVICE, CAMERA DEVICE, AND ELECTRONIC APPARATUS INCLUDING THE SAME

(71) Applicant: LG ELECTRONICS INC., Seoul (KR)

(72) Inventors: Changhwan Lee, Seoul (KR); Yunsup Shin, Seoul (KR); Yungwoo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/234,749

(22) Filed: Apr. 19, 2021

(65) Prior Publication Data

US 2021/0334991 A1 Oct. 28, 2021

(30) Foreign Application Priority Data

Apr. 22, 2020 (KR) .................. 10-2020-0048740

(51) Int. Cl.
*G06T 7/521* (2017.01)
*G01S 17/42* (2006.01)
(Continued)

(52) U.S. Cl.
CPC .............. *G06T 7/521* (2017.01); *G01S 17/42* (2013.01); *G01S 17/89* (2013.01); *G02B 7/021* (2013.01);
(Continued)

(58) Field of Classification Search
None
See application file for complete search history.

(56) References Cited

U.S. PATENT DOCUMENTS 11,274,929 B1 * 3/2022 Afrouzi ............... G01C 21/165
2016/0072258 A1 3/2016 Seurin et al.
(Continued)

FOREIGN PATENT DOCUMENTS

JP 2019-215246 12/2019
KR 10-2014-0041012 4/2014
(Continued)

OTHER PUBLICATIONS

PCT International Application No. PCT/KR2021/004812, International Search Report dated Jul. 29, 2021, 3 pages.
(Continued)

*Primary Examiner* — Kaitlin A Retallick
(74) *Attorney, Agent, or Firm* — LEE, HONG, DEGERMAN, KANG & WAIMEY

(57) ABSTRACT

An optical device includes: a first light emitting device that emits a plurality of line pattern lights spaced apart from each other to a target area; at least one sensor device that detects a received light, which is the emitted line pattern light, that is reflected from the target area; and a controller that calculates a parallax distance from a pattern of the detected received light, and acquires depth information of the target area by using the calculated parallax distance, wherein the first light emitting device includes: at least one light emitting unit including at least one light emitting element and emitting light of a specific wavelength; and a first optical member that generates light emitted from the at least one light emitting unit into at least one line pattern light.

2 Claims, 30 Drawing Sheets

(51) Int. Cl.
*G01S 17/89* (2020.01)
*G02B 7/02* (2021.01)
*G02B 27/42* (2006.01)
*H04N 23/56* (2023.01)

(52) U.S. Cl.
CPC ......... *G02B 27/4205* (2013.01); *H04N 23/56* (2023.01); *G06T 2207/10028* (2013.01)

(56) References Cited

U.S. PATENT DOCUMENTS

| | | |
|---|---|---|
| 2016/0197452 A1 | 7/2016 | Mor |
| 2017/0115497 A1 | 4/2017 | Chen et al. |
| 2018/0267663 A1* | 9/2018 | Cho ........................ G01S 11/12 |
| 2019/0035100 A1* | 1/2019 | Ebrahimi Afrouzi .. G06V 20/58 |
| 2019/0196215 A1 | 6/2019 | Lee et al. |
| 2021/0243424 A1* | 8/2021 | Wu ........................ H04N 25/71 |

FOREIGN PATENT DOCUMENTS

| | | |
|---|---|---|
| KR | 10-1802894 | 11/2017 |
| KR | 10-2018-0104970 | 9/2018 |
| WO | 2020-075932 | 4/2020 |

OTHER PUBLICATIONS

European Patent Office Application Serial No. 21169976.4, Search Report dated Aug. 20, 2021, 8 pages.

\* cited by examiner

[Fig. 1]
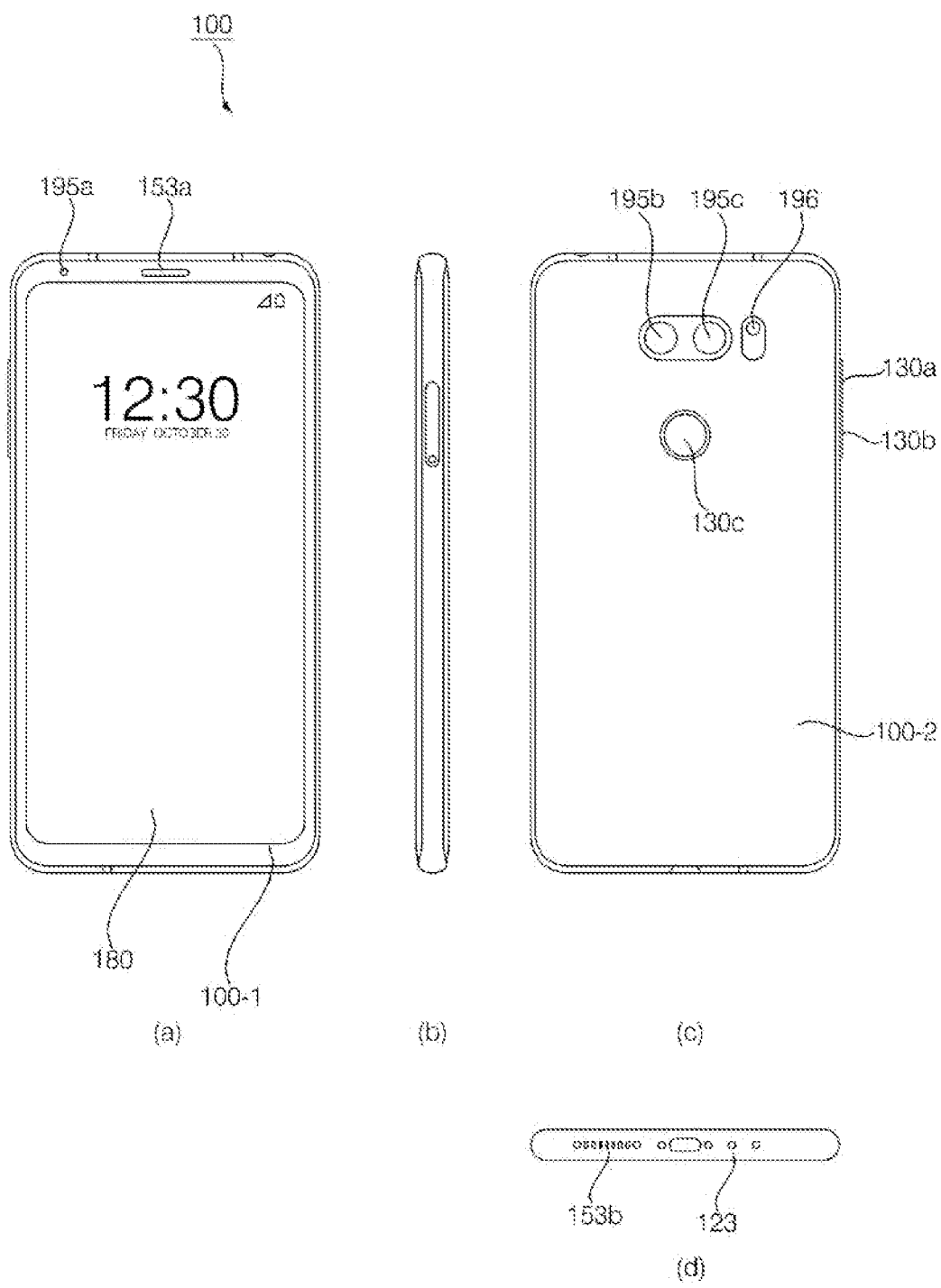

[Fig. 2]
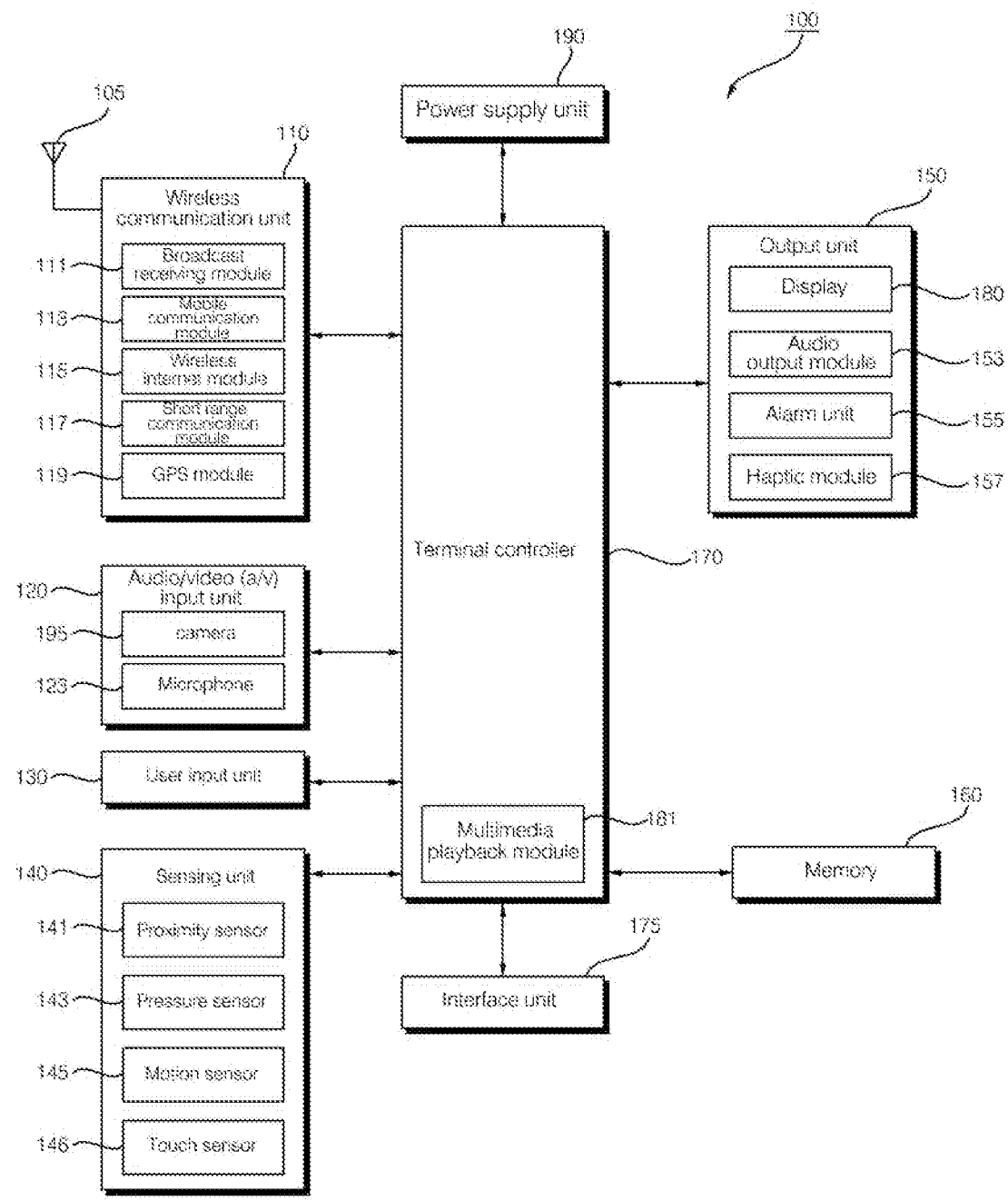

[Fig. 3a]
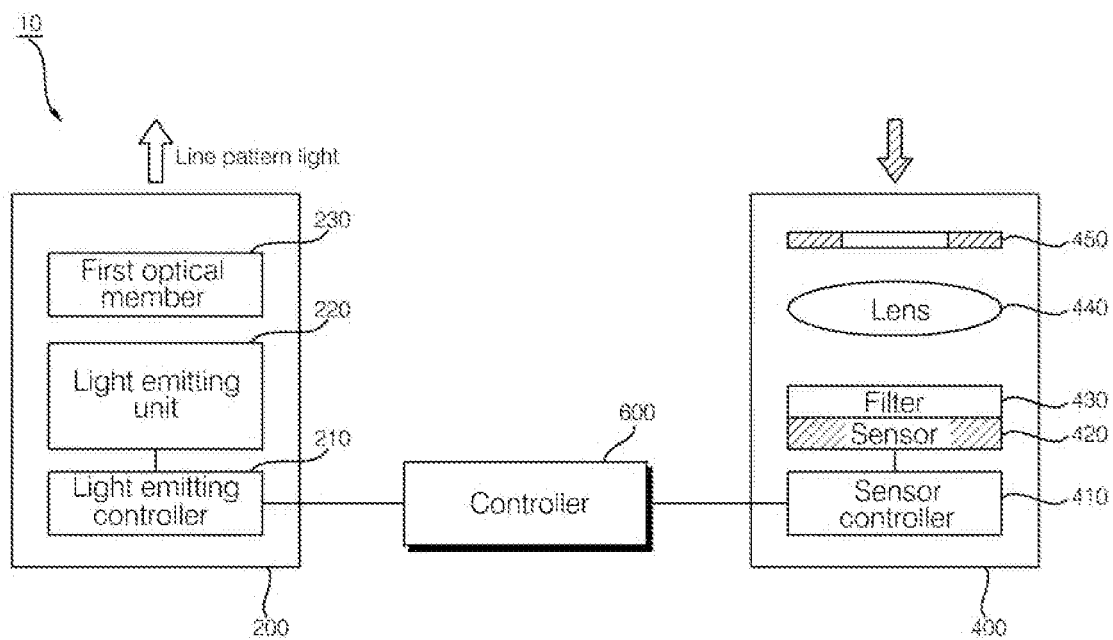

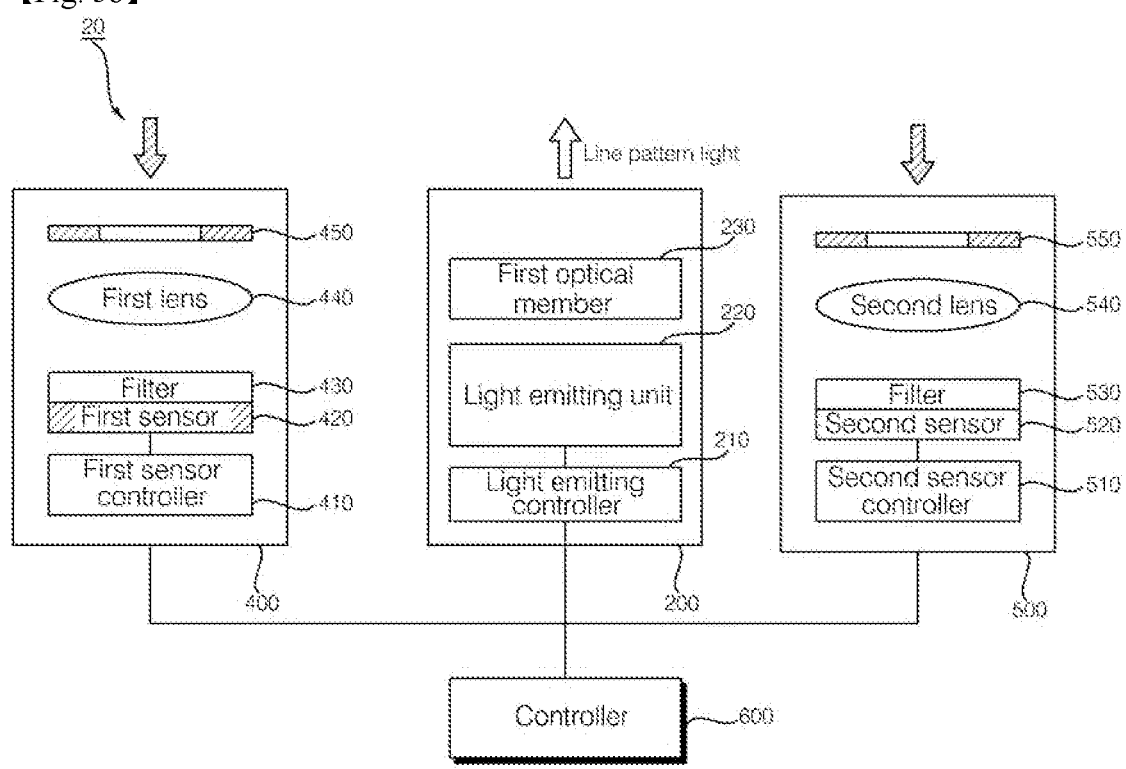
[Fig. 3b]

[Fig. 4a]
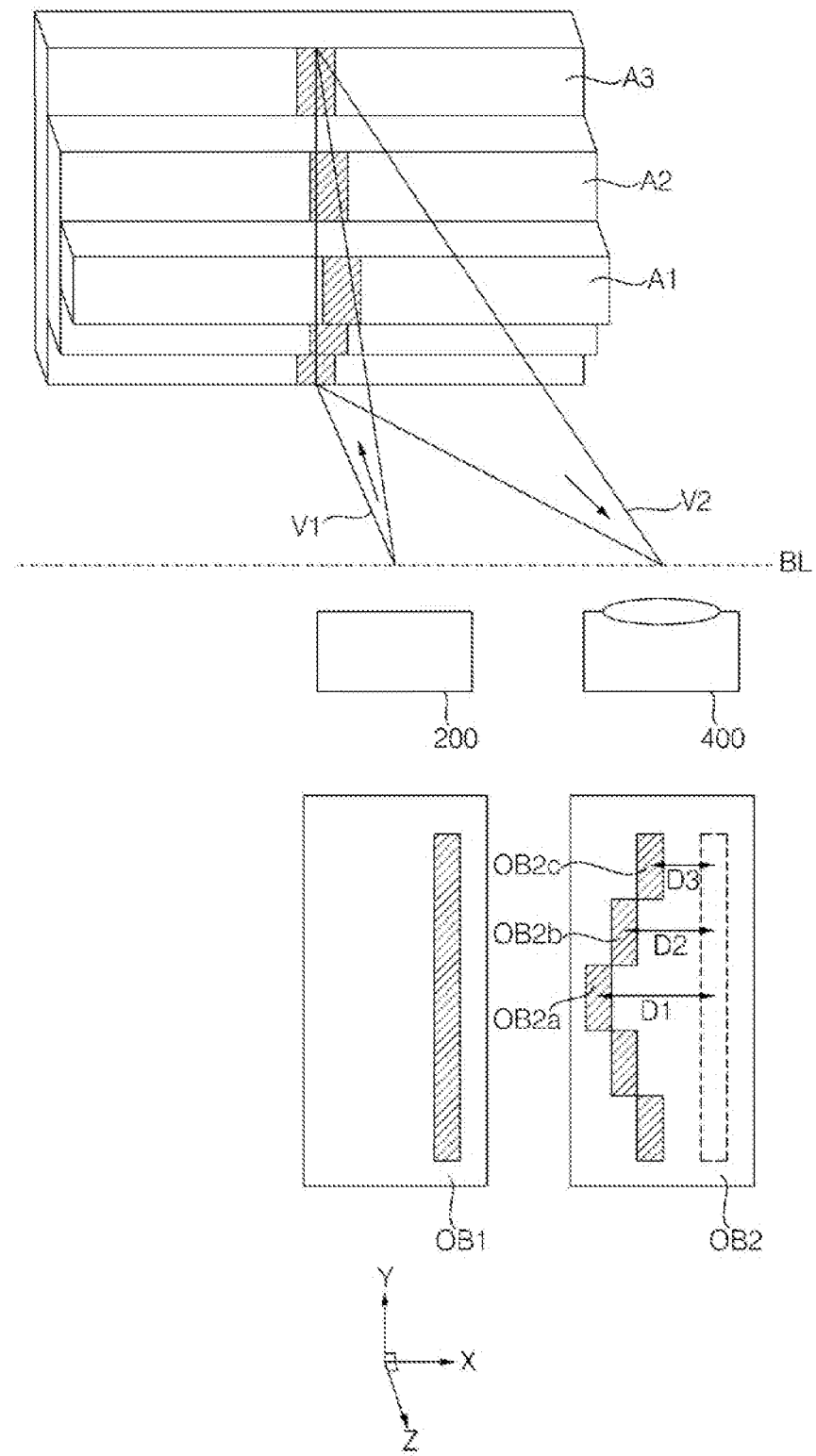

[Fig. 4b]
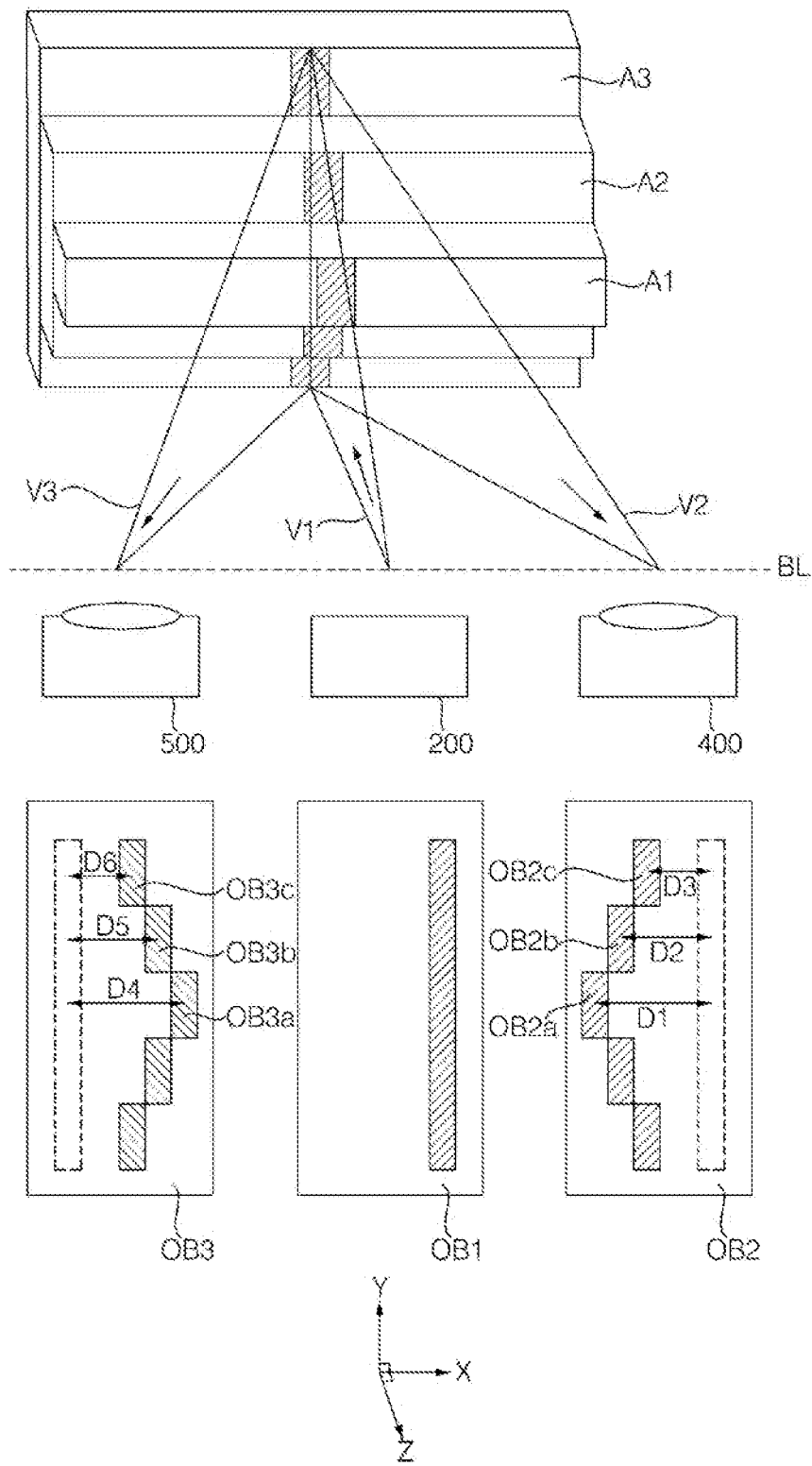

[Fig. 5a]
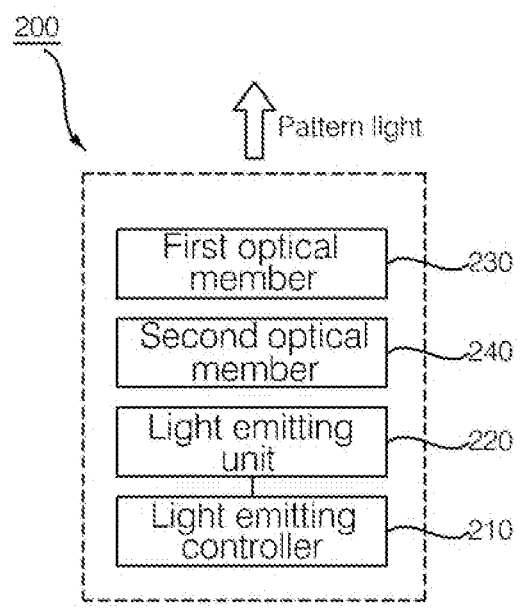

【Fig. 5b】
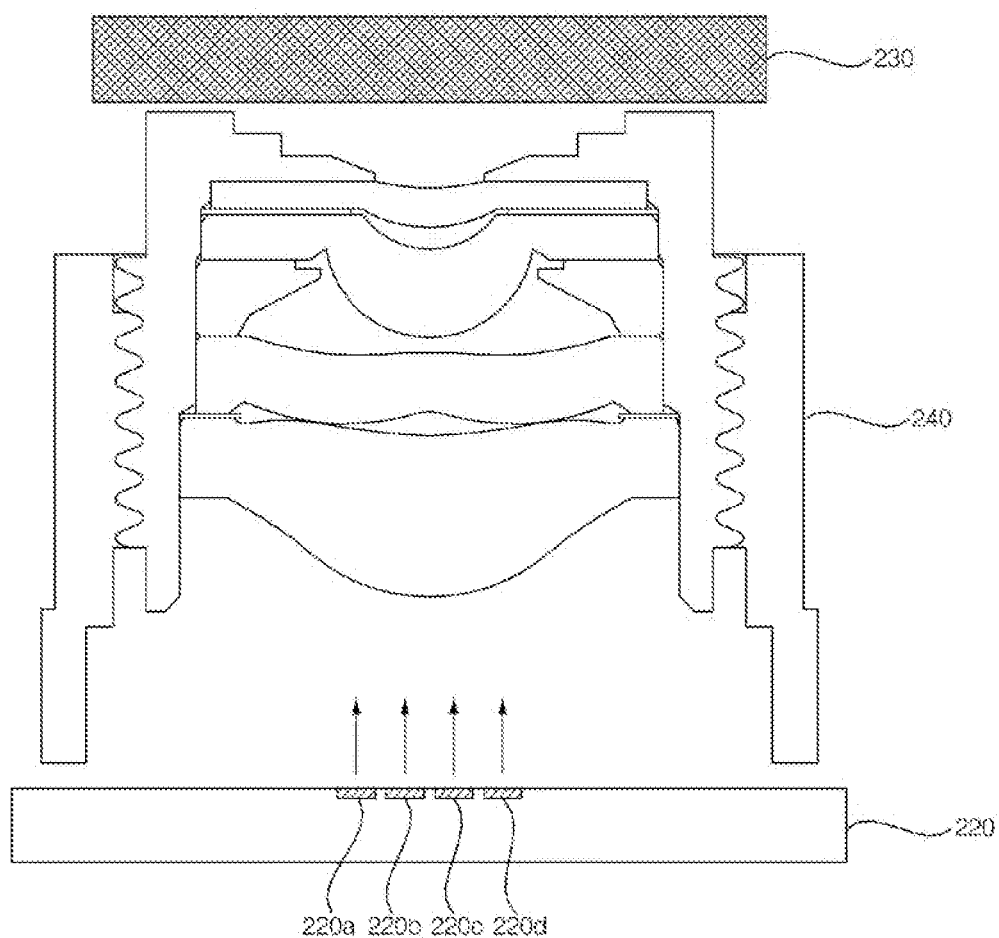

[Fig. 6]
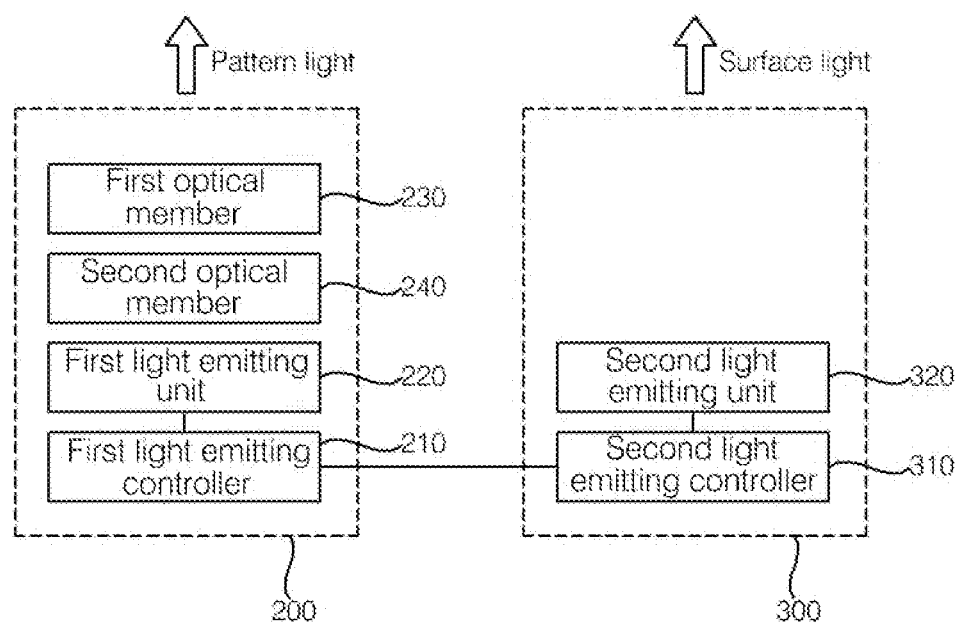

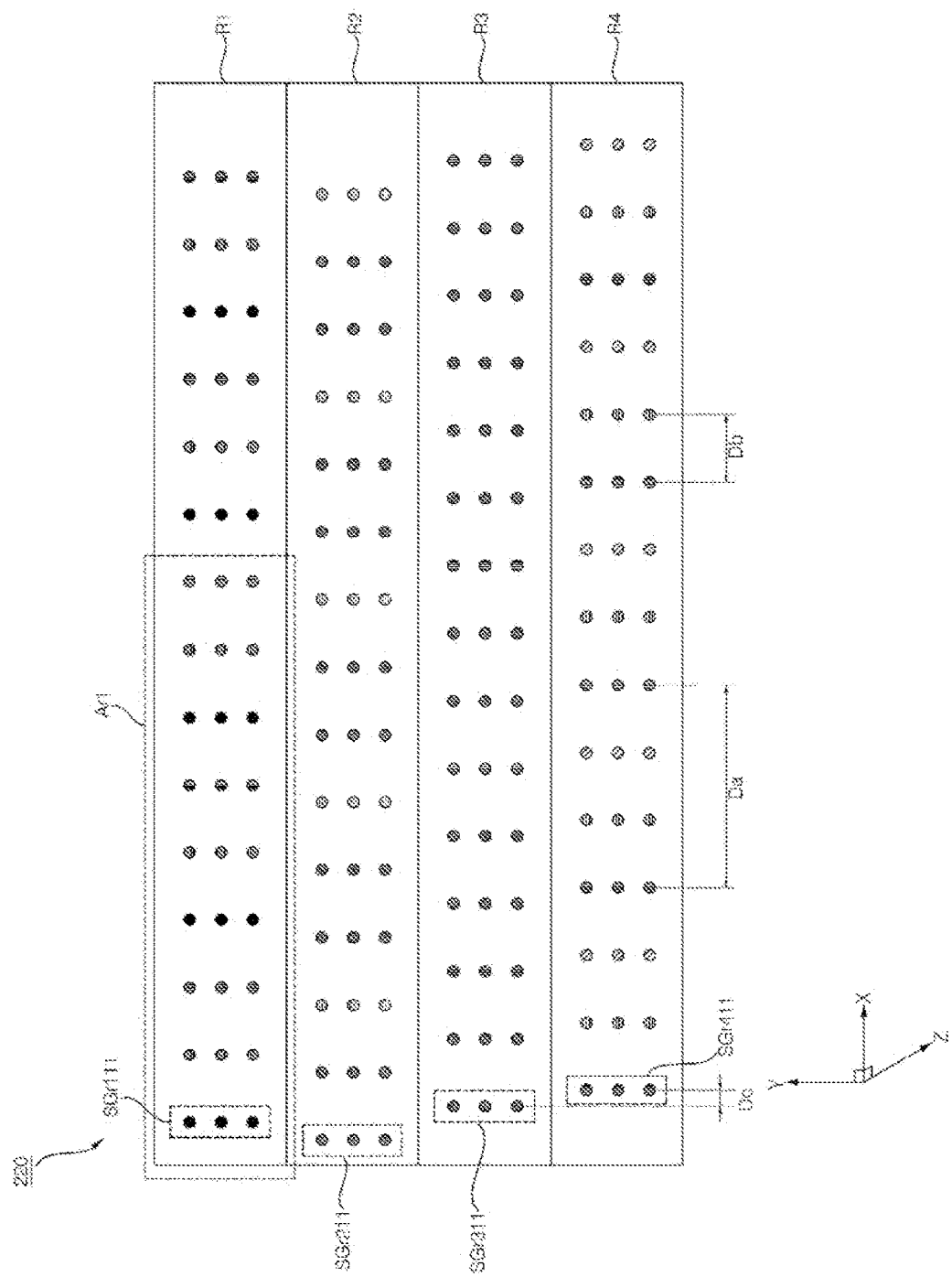
[Fig. 7a]

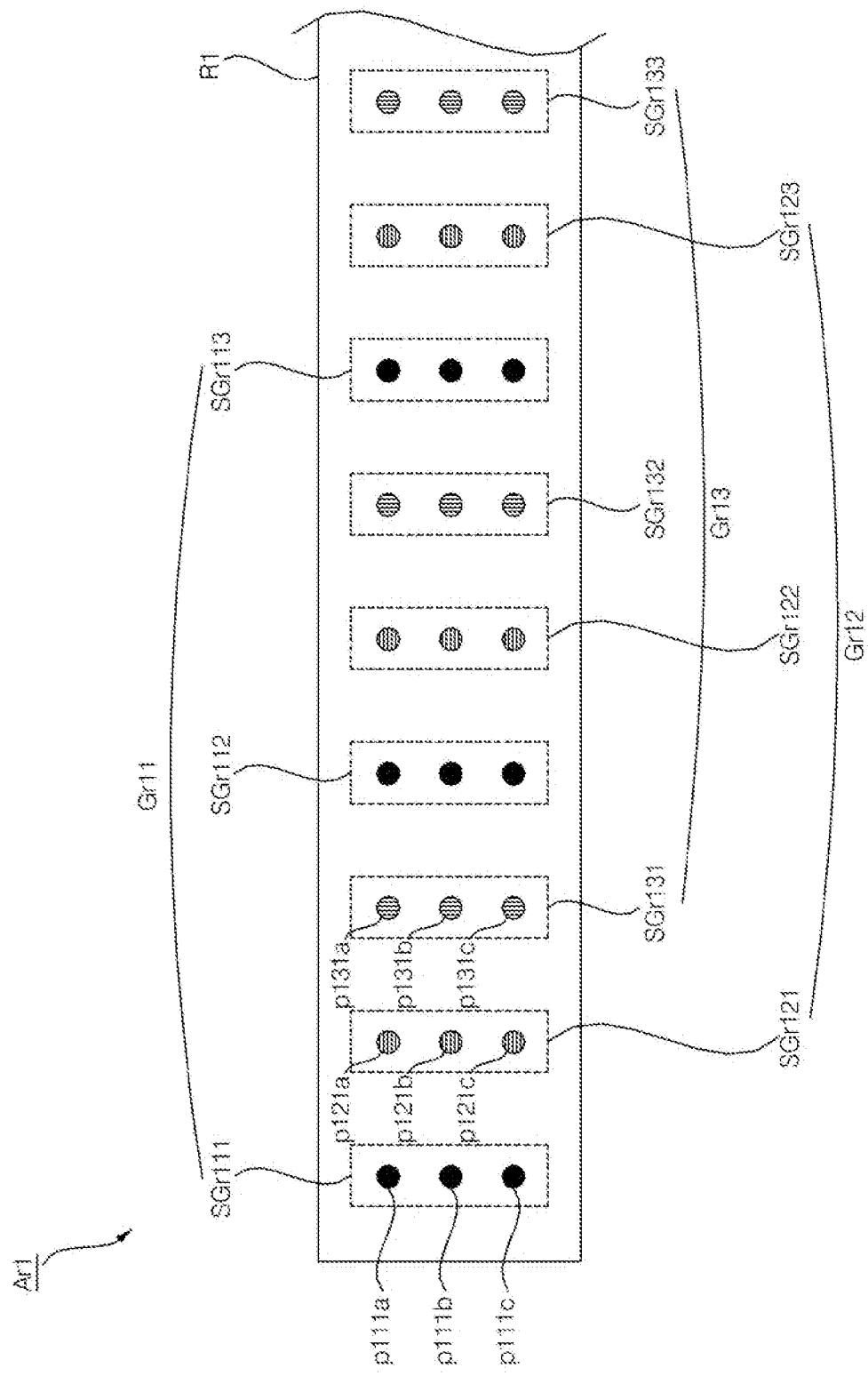
[Fig. 7b]

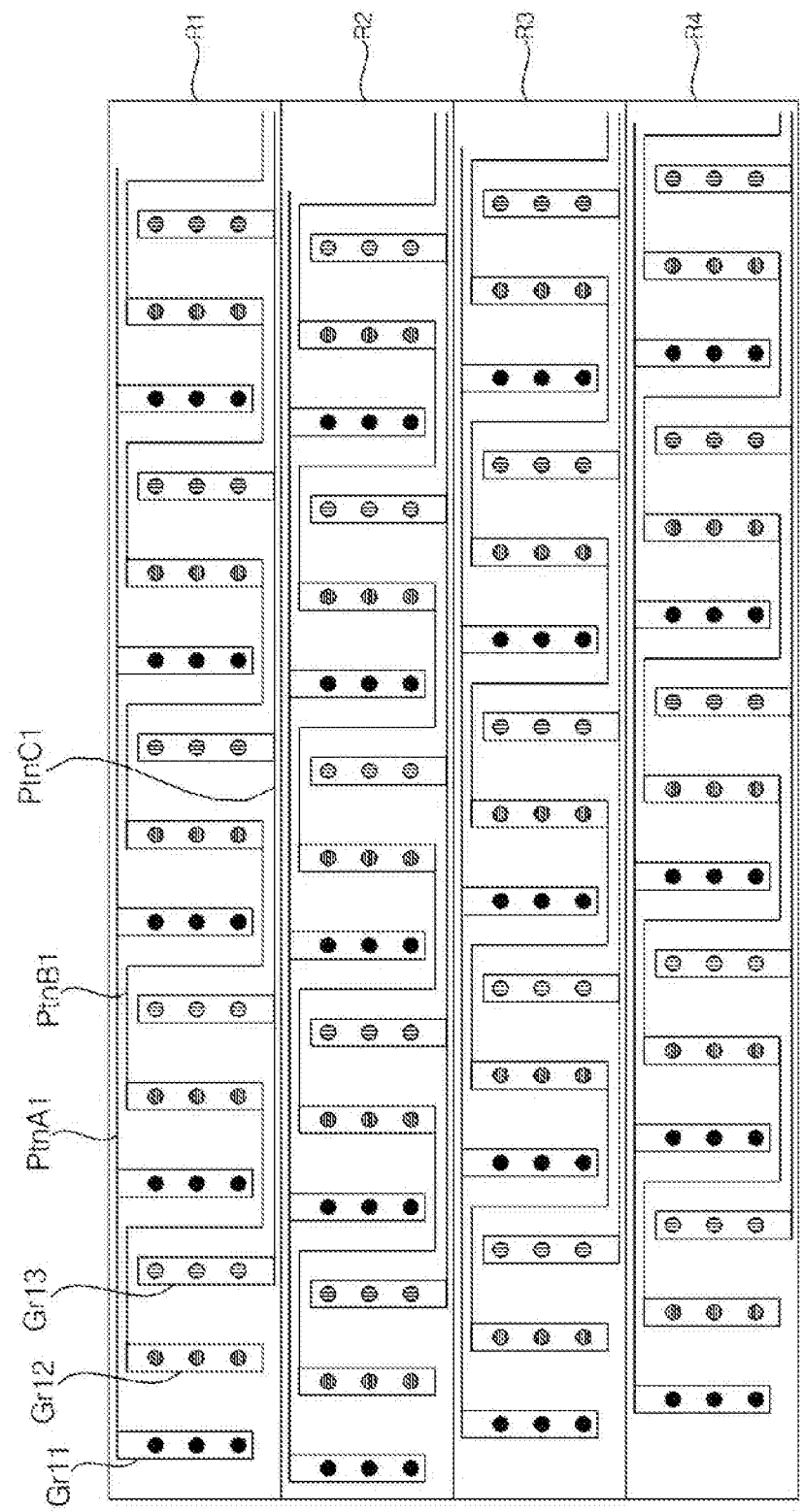
[Fig. 8a]

[Fig. 8b]
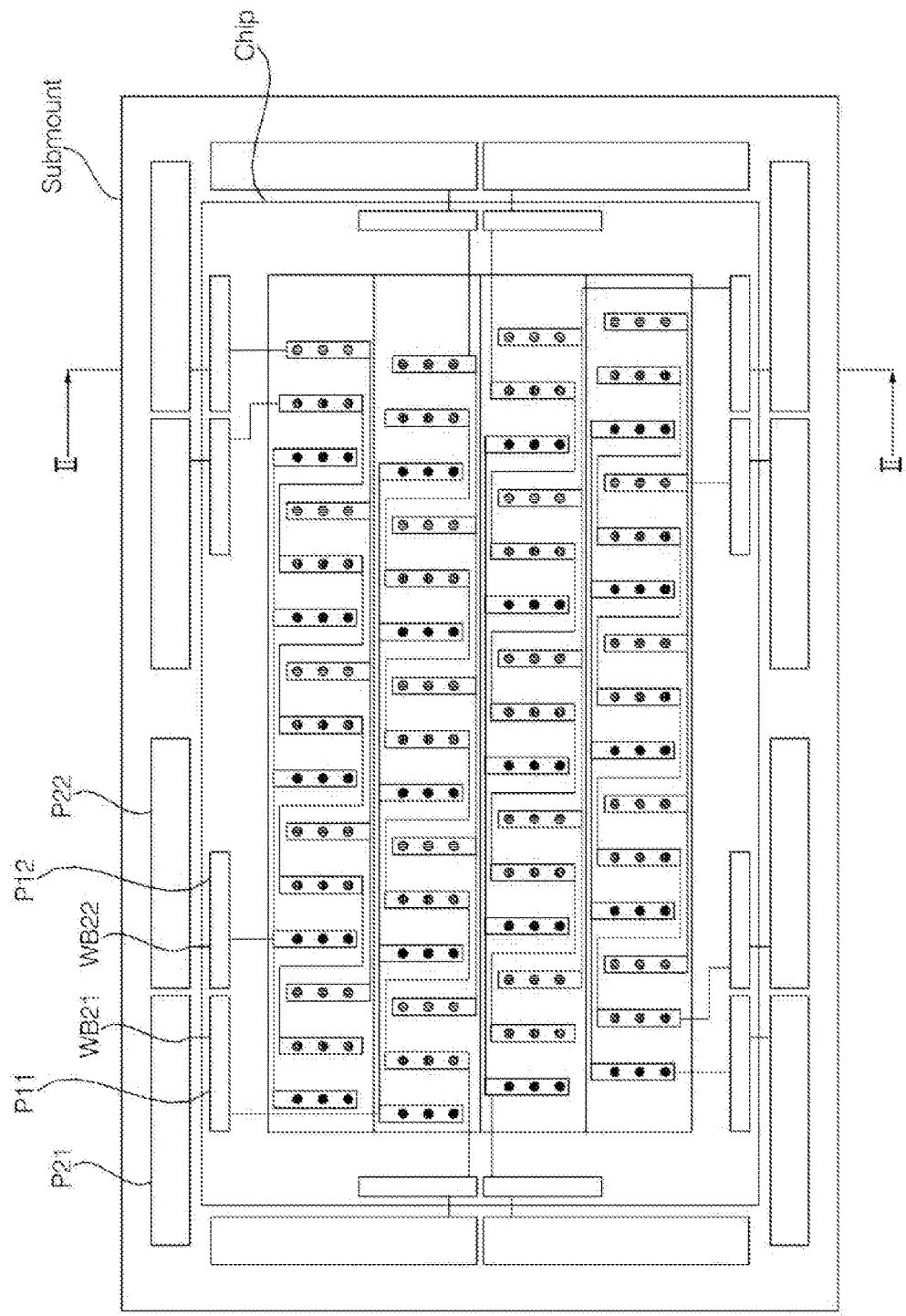

[Fig. 8c]
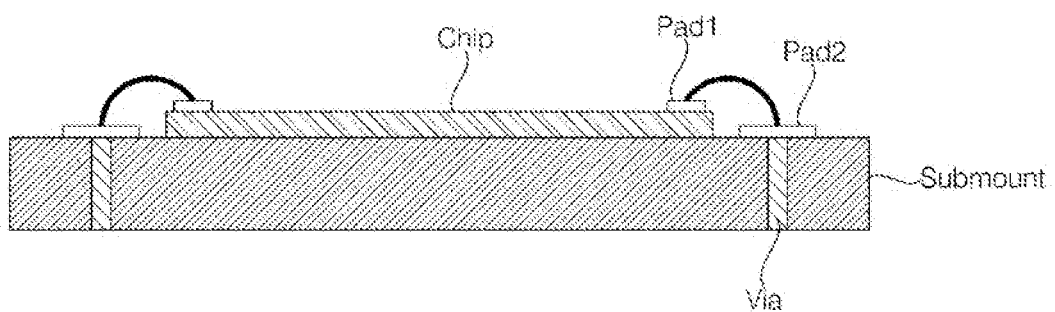

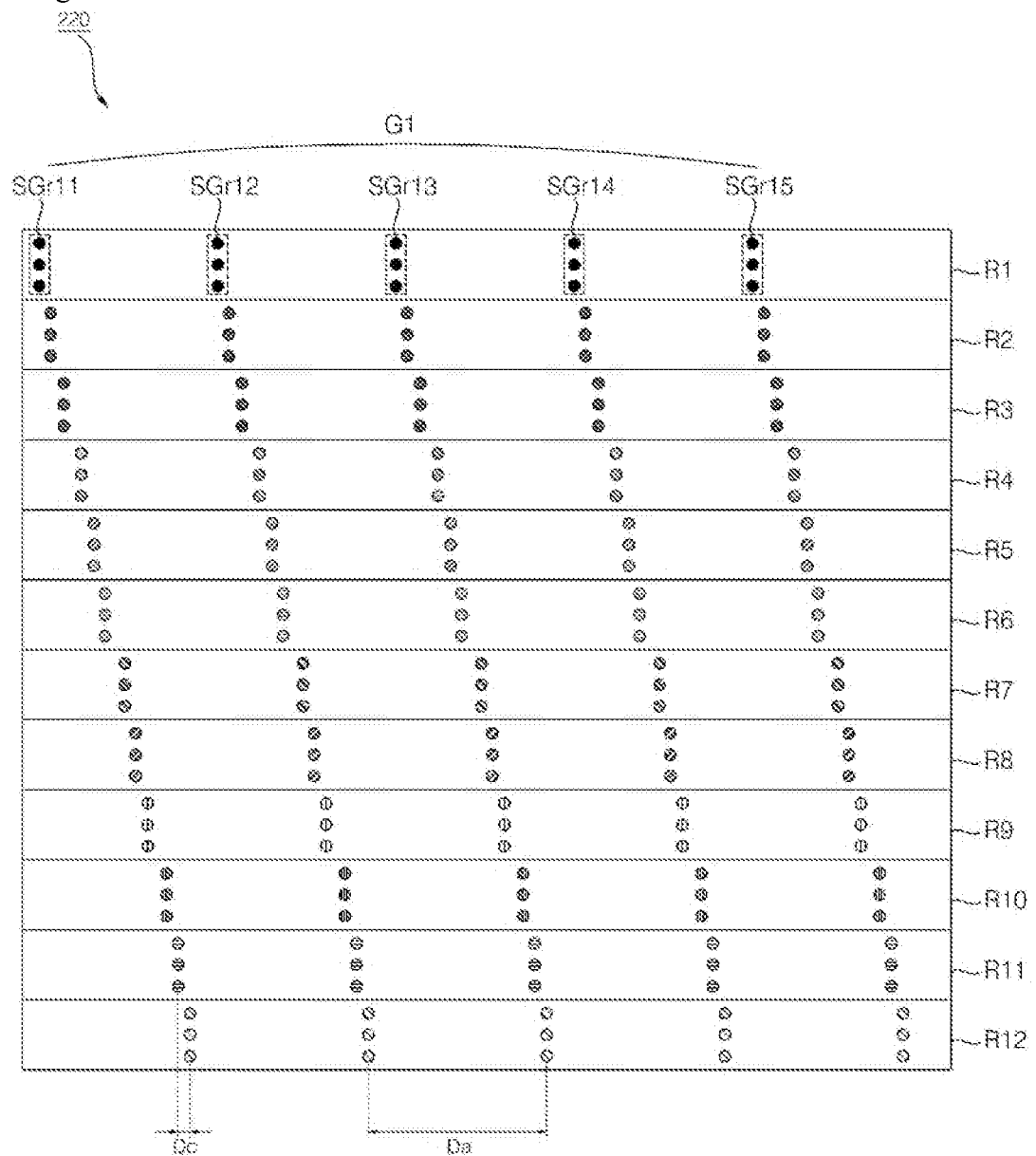
[Fig. 9]

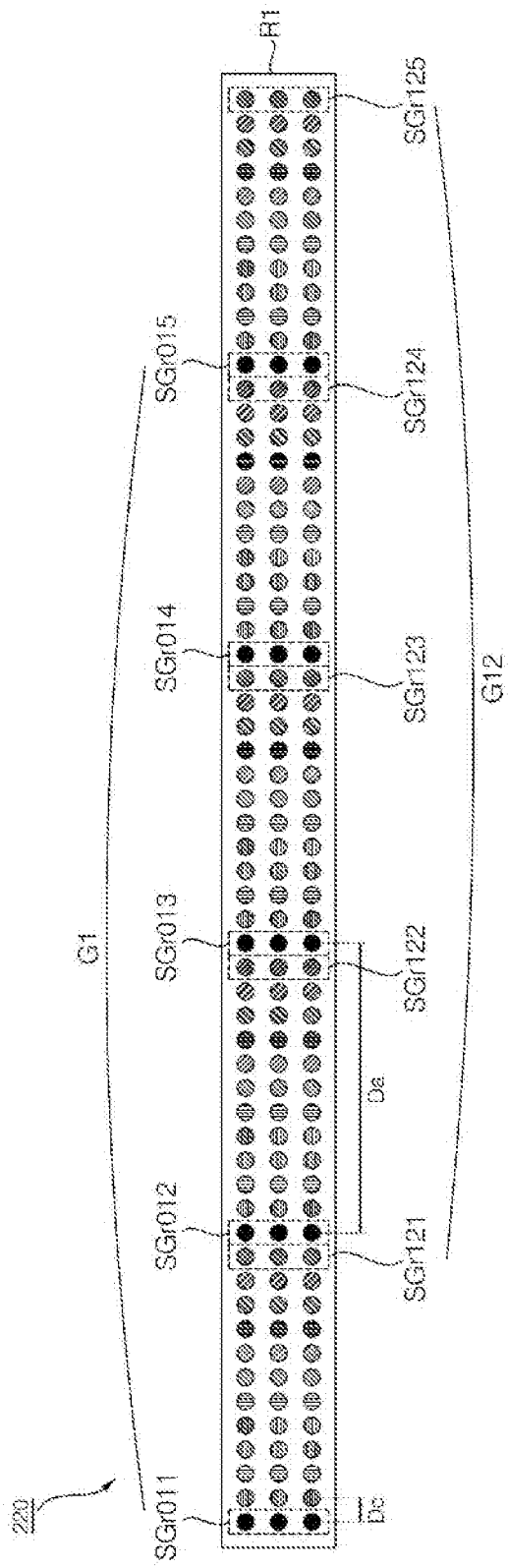
[Fig. 10]

【Fig. 11a】
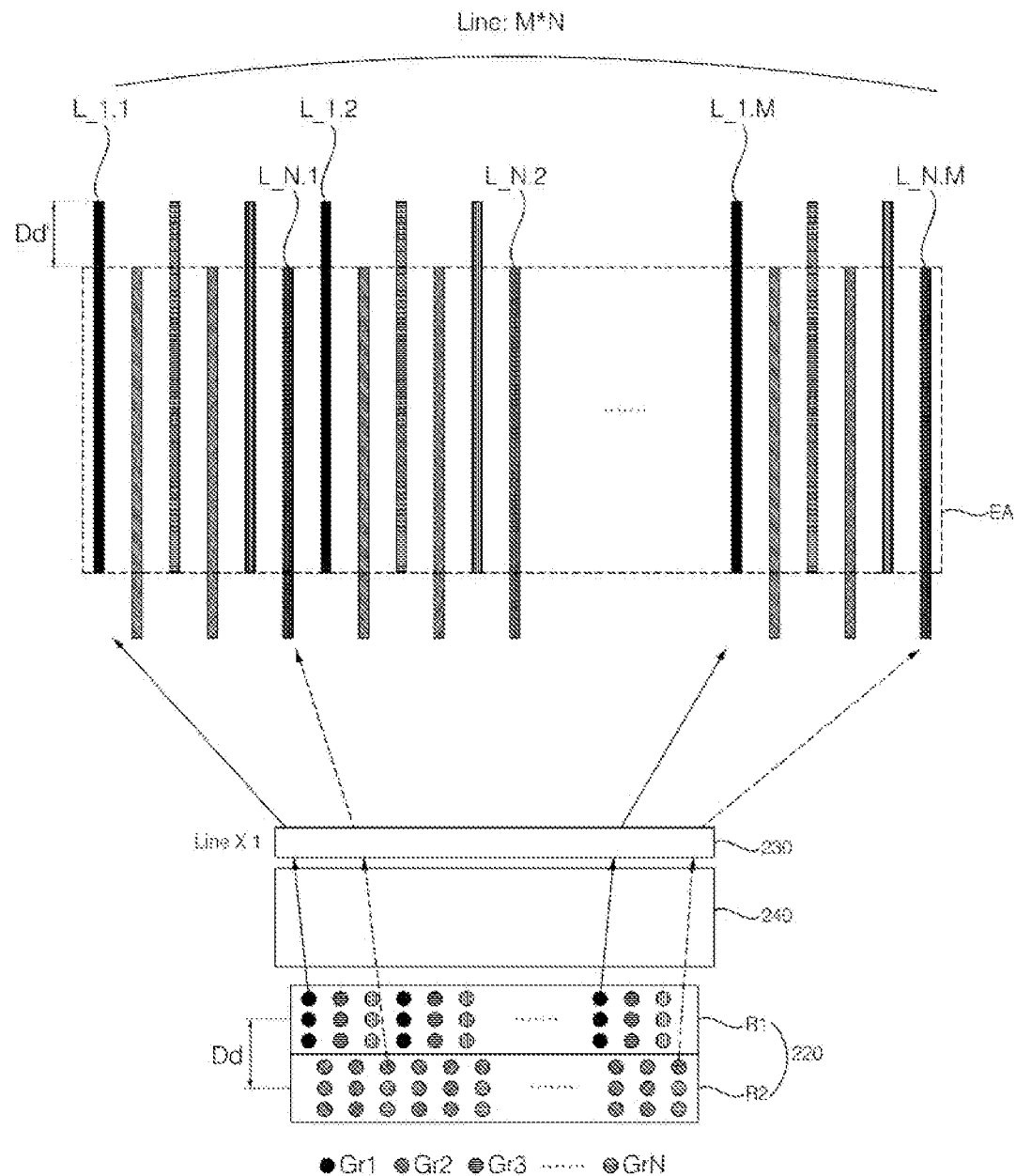

[Fig. 11b]
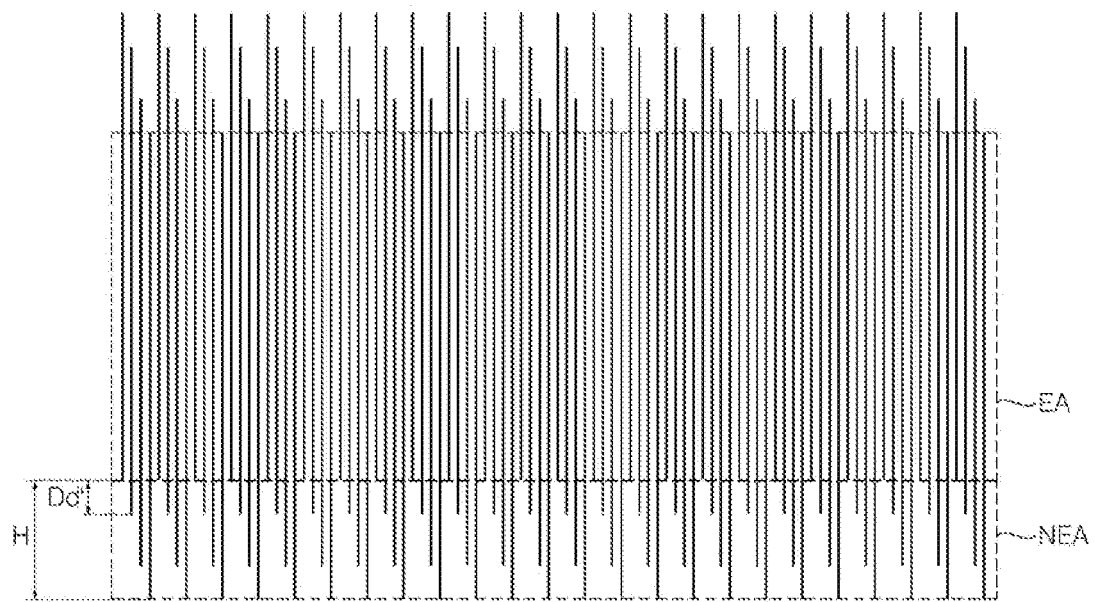

[Fig. 12a]
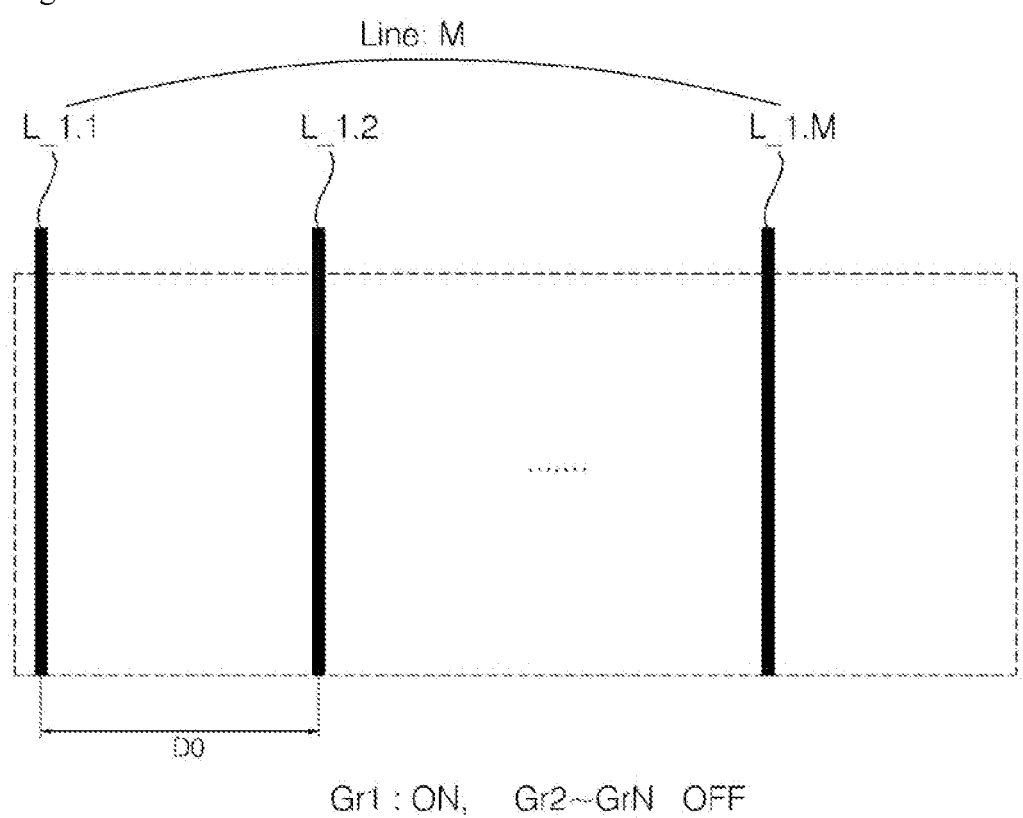

【Fig. 12b】
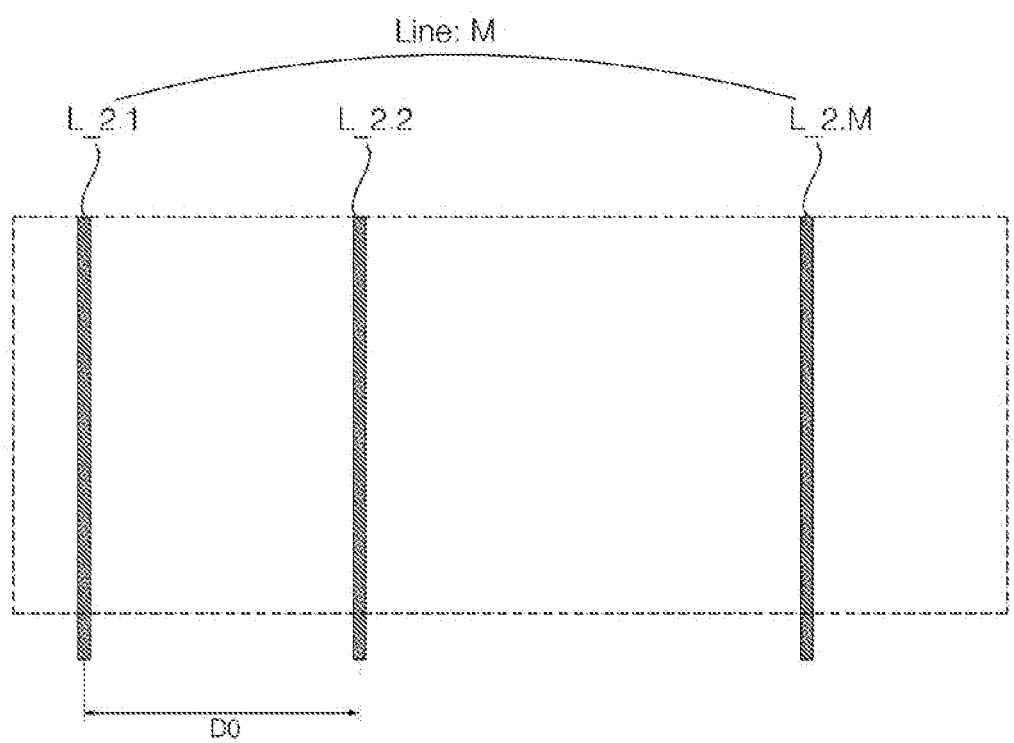

[Fig. 12c]
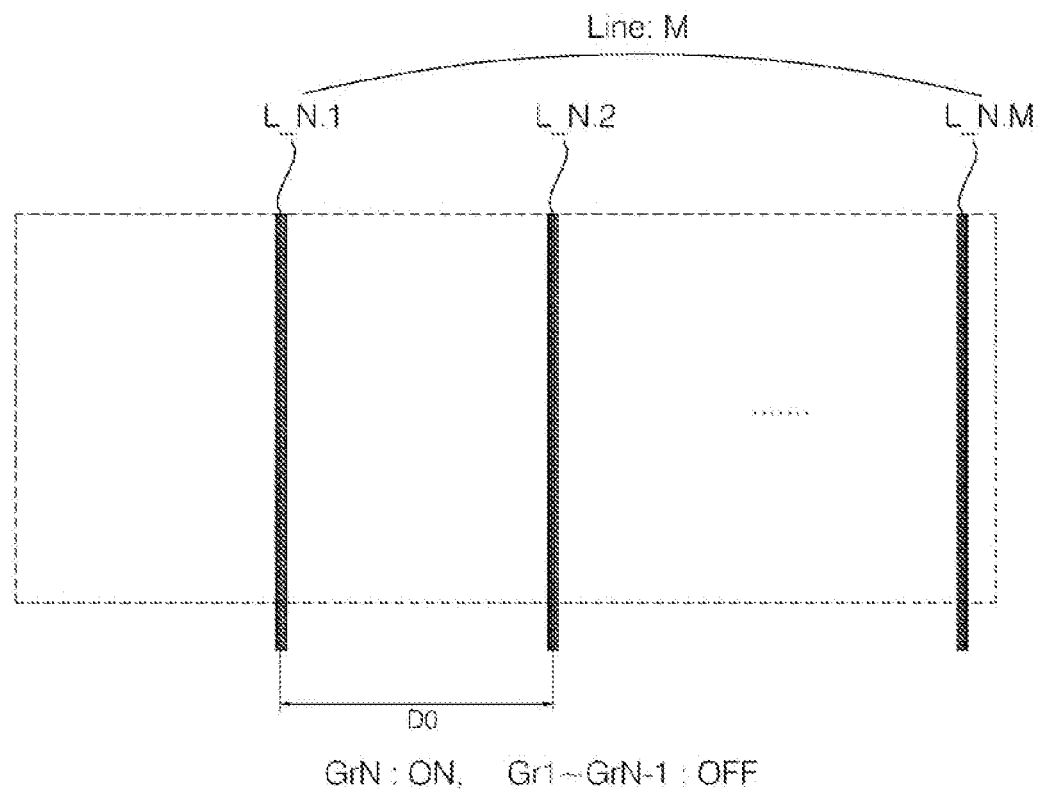

[Fig. 13]
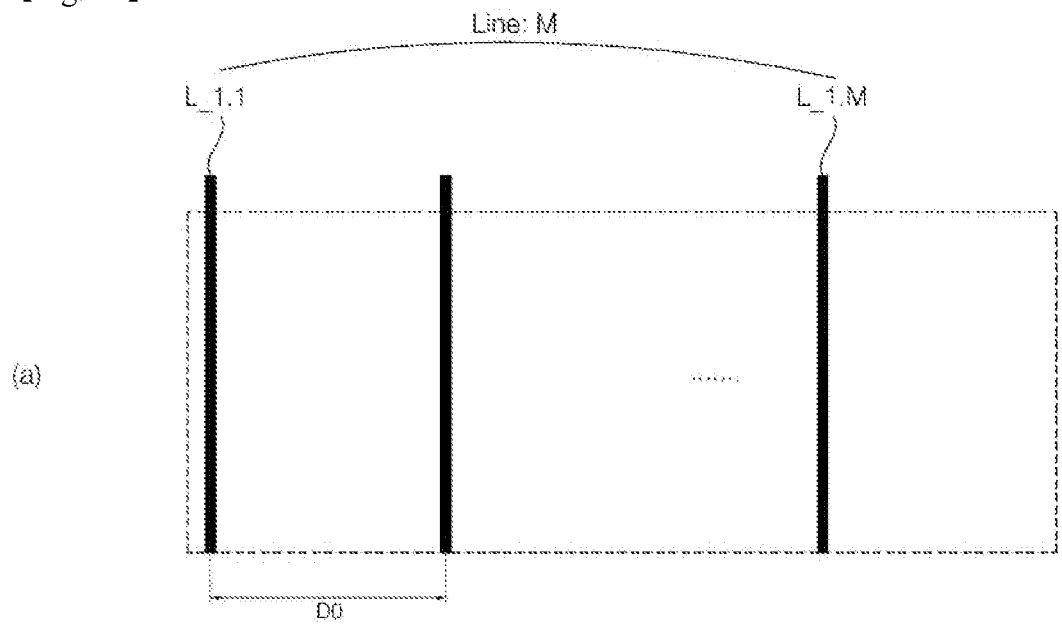
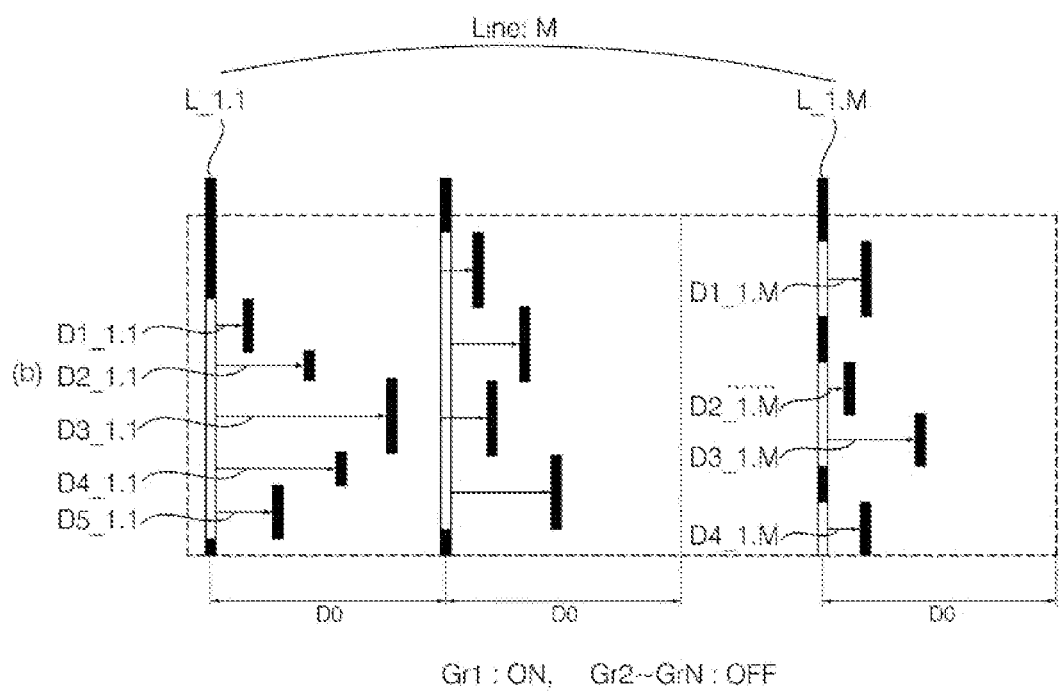

[Fig. 14]
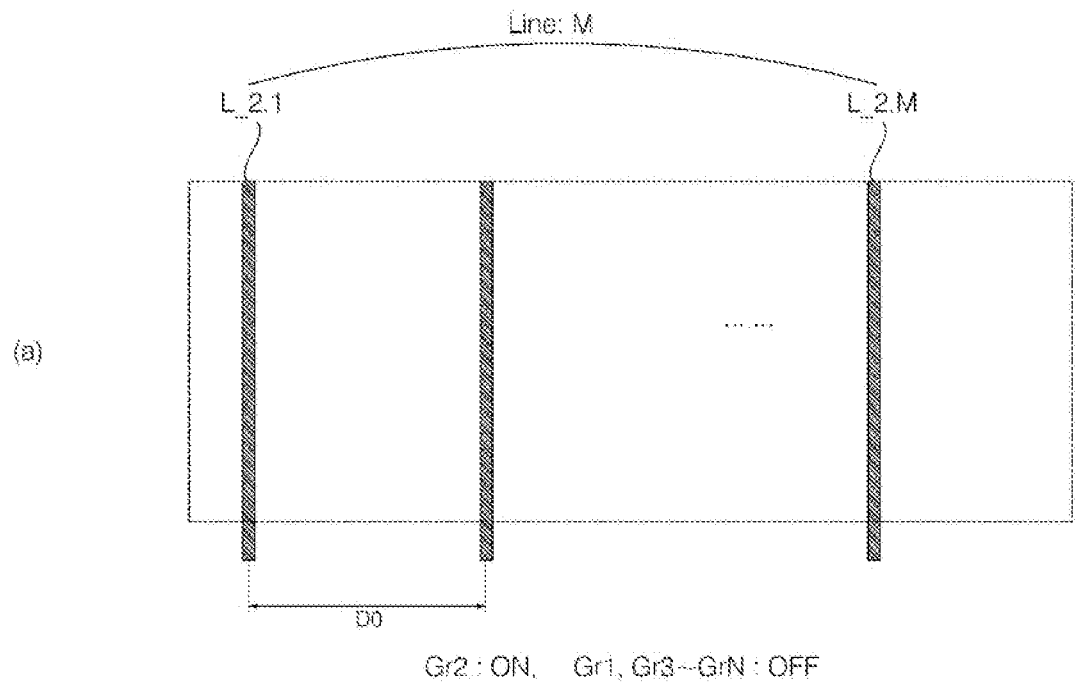
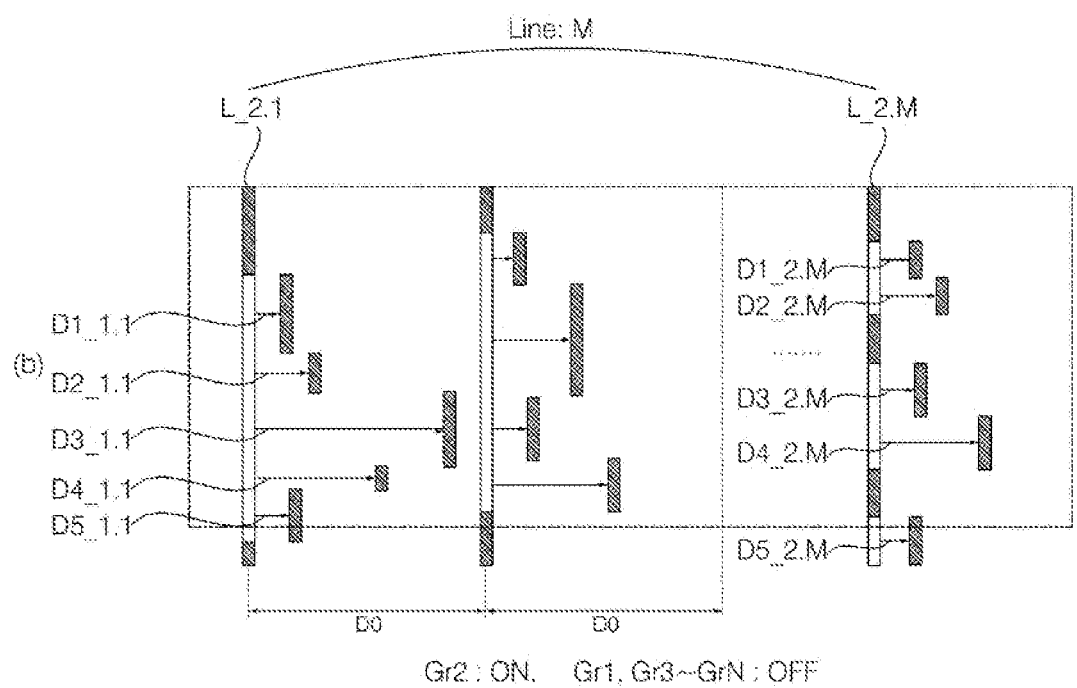

[Fig. 15]
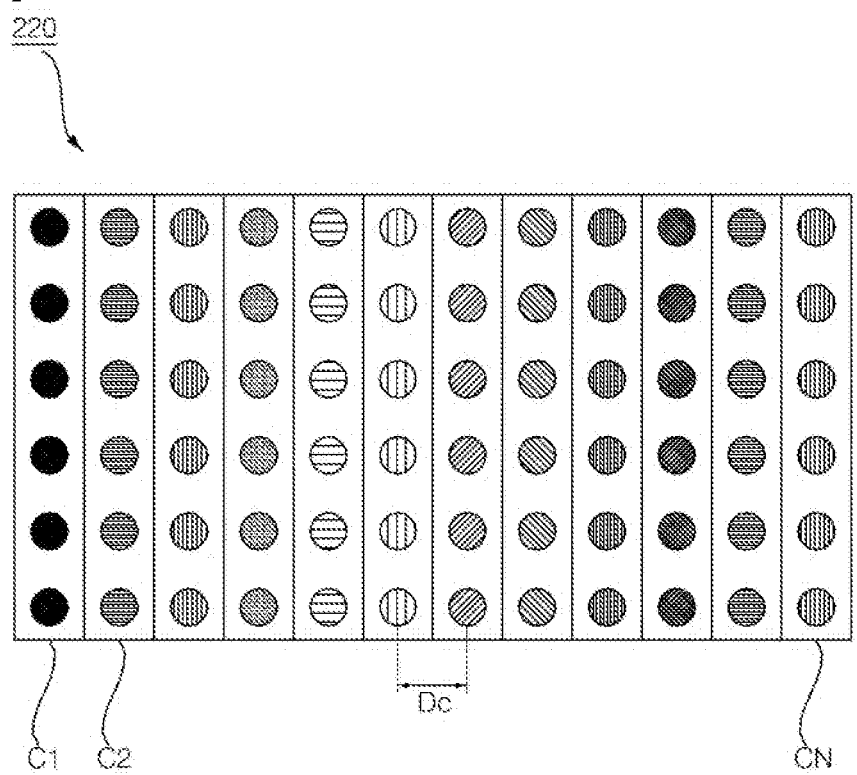

[Fig. 16]
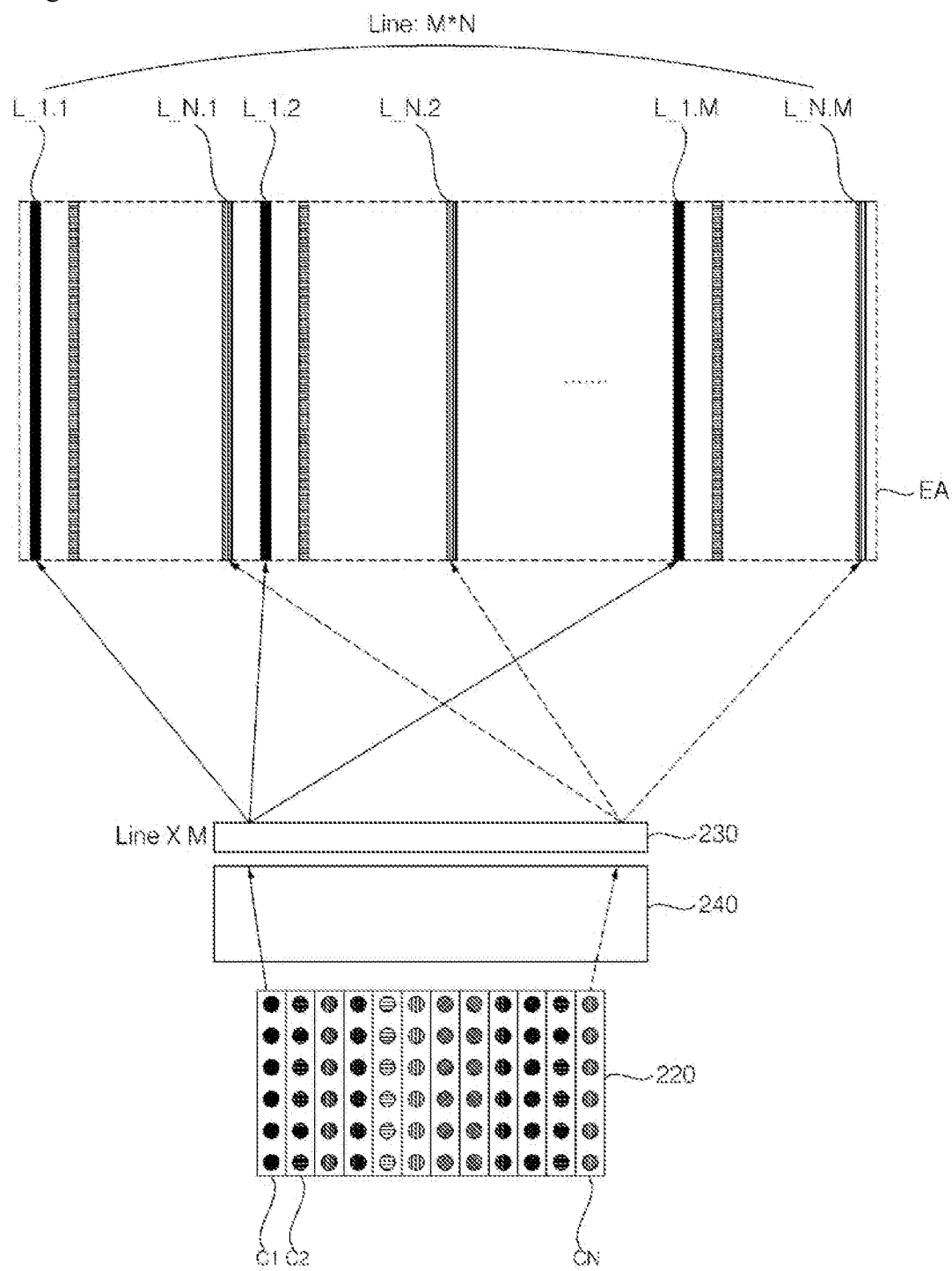

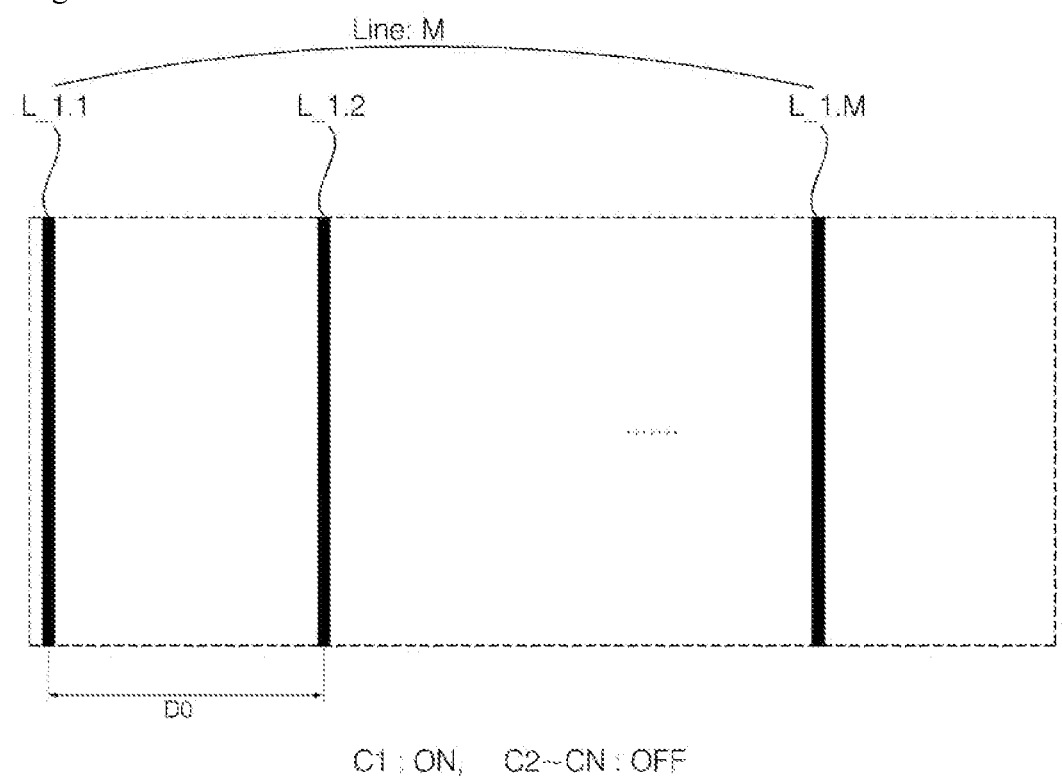
[Fig. 17a]

[Fig. 17b]
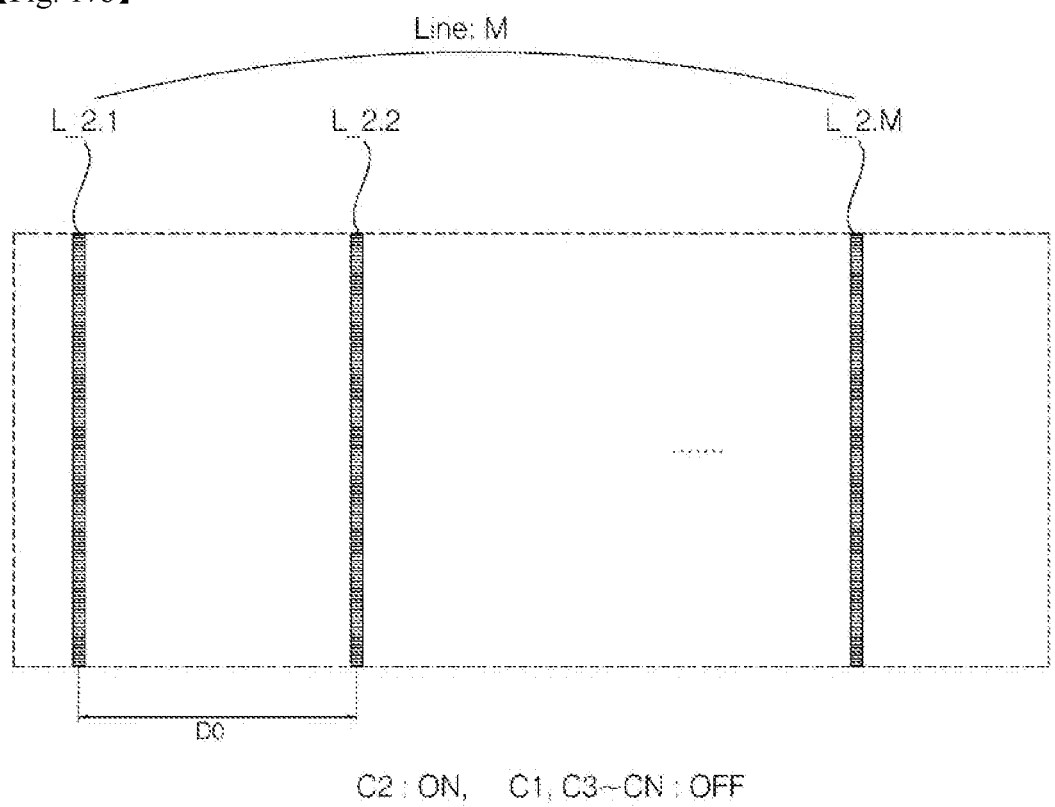

[Fig. 17c]
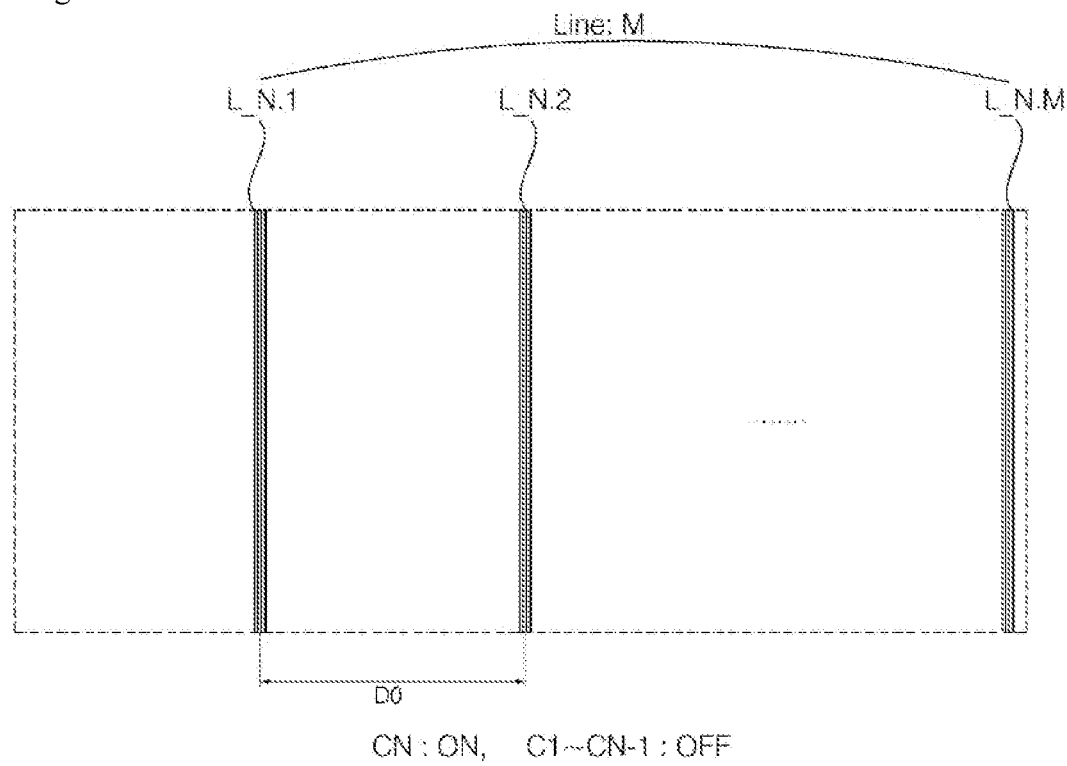

[Fig. 18]
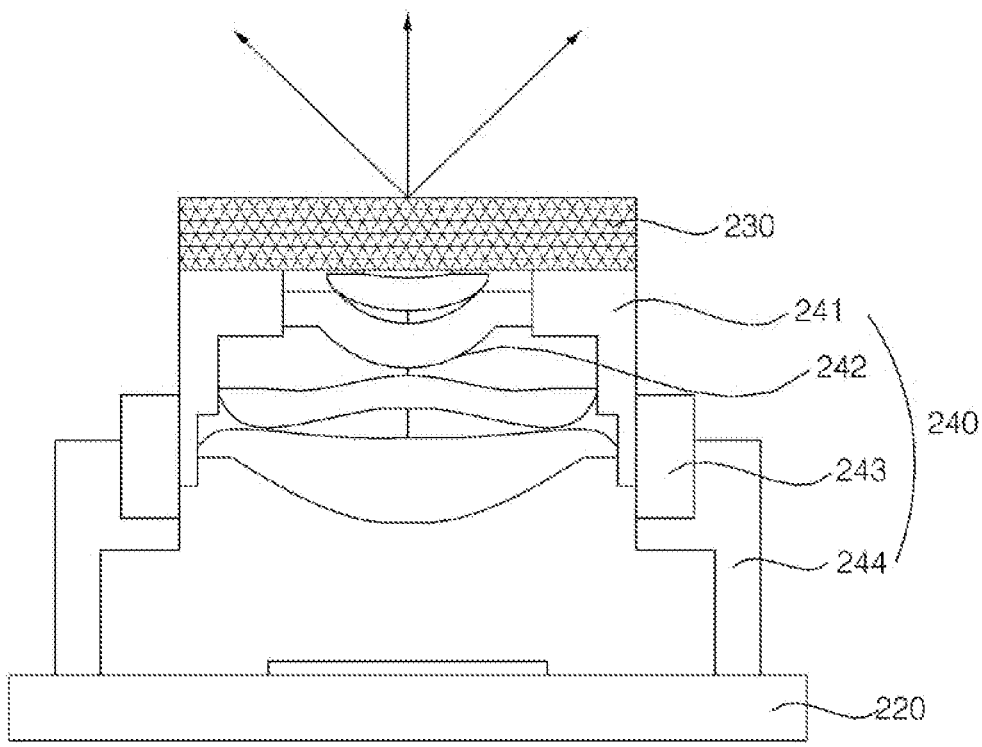

[Fig. 19]
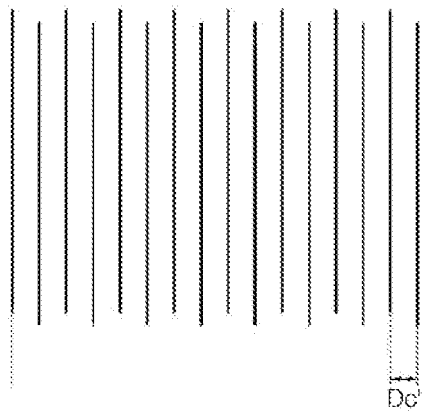
(a) Period 1
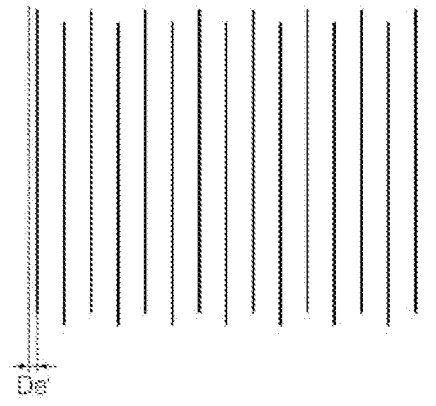
(b) Period 2
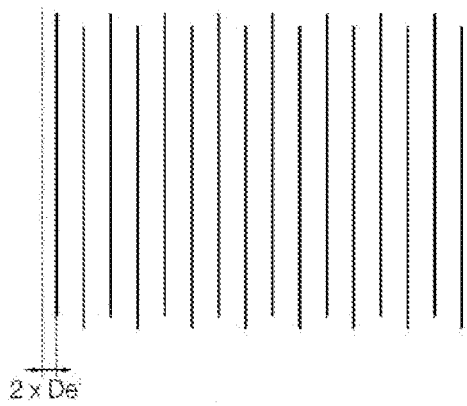
(c) Period 3
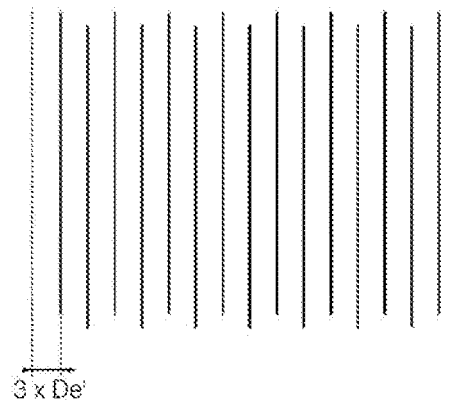
(d) Period 4
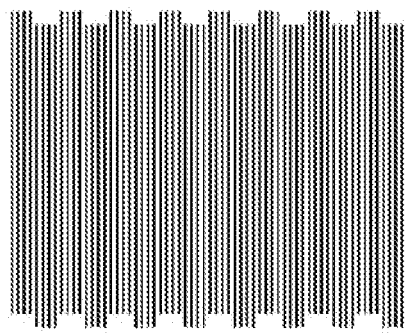
(e) Merged

OPTICAL DEVICE, CAMERA DEVICE, AND ELECTRONIC APPARATUS INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2020-0048740, filed on Apr. 22, 2020, the disclosure of which is incorporated herein by reference.

BACKGROUND OF THE INVENTION

1. Field of the Invention

The present disclosure relates to an optical device and an electronic apparatus including the same, and more particularly, to an optical device capable of reducing the amount of calculation and increasing the resolution and accuracy of depth information, by acquiring depth information of a target area by using a plurality of line pattern lights spaced apart from each other, and a camera device and an electronic apparatus including the same.

2. Description of the Related Art

Recently, as the performance of sensor applied to an optical device is developed, various functions using optical devices have been developed. Attempt to implement a three-dimensional image by reflecting the shape of real object such as human and object has continued.

A depth camera is used to acquire a three-dimensional depth image. In general, a technology (Time of flight: ToF) using a temporal transformation of a light source, a structured light camera, or an active stereo camera is used for the depth camera.

The ToF method is a method of measuring the distance of a target area based on the difference between the time to irradiate light to the target area and the time to receive the light reflected from the target area, and the structured light method is a method of measuring the distance of the target area by irradiating a pattern light to the target area, and analyzing the pattern appeared in a reflected light. In addition, the active stereo camera method is a method of measuring a distance by photographing the same target area by two cameras and comparing parallax of the same target object included in the photographed image.

In a depth camera, the performance and operation control of light emitting element and sensor are important. The ToF method has a problem in that the camera's sensor dependence is high, the resolution is low, and the accuracy of the calculated depth information is poor. A conventional structured light camera method has a problem in that the price is high, because the number of light emitting devices required for generating a random pattern is large, and a separate processor is required for image processing. The active stereo camera method has a problem in that it is difficult to apply a high-resolution sensor because a large amount of calculation is required to acquire depth information.

SUMMARY OF THE INVENTION

The present disclosure has been made in view of the above problems, and provides an optical device, a camera device, and an electronic apparatus capable of reducing the amount of calculation for acquiring depth information by acquiring depth information of a target area by using a plurality of line pattern lights spaced apart from each other.

In addition, in order to solve the above problems, the present disclosure further provides an optical device, a camera device, and an electronic apparatus capable of minimizing the size of a light emitting device, when the light emitting device includes at least one light emitting unit including light emitting elements which are arranged in a plurality of groups In addition, in order to solve the above problems, the present disclosure further provides an optical device, a camera device, and an electronic apparatus capable of reducing power consumption of a light emitting device, when the light emitting device includes a vertical cavity surface emitting laser and a light conversion optical member.

In addition, in order to solve the above problems, the present disclosure further provides an optical device, a camera device, and an electronic apparatus capable of increasing the resolution and accuracy of depth information by acquiring the depth information while moving the position of a first optical member through an actuator.

In accordance with an aspect of the present disclosure, an optical device includes: a first light emitting device that emits a plurality of line pattern lights spaced apart from each other to a target area; at least one sensor device that detects a received light, which is the emitted line pattern light, that is reflected from the target area; and a controller that calculates a parallax distance from a pattern of the detected received light, and acquires depth information of the target area by using the calculated parallax distance, wherein the first light emitting device includes: at least one light emitting unit including at least one light emitting element and emitting light of a specific wavelength; and a first optical member that generates light emitted from the at least one light emitting unit into at least one line pattern light.

The at least one light emitting element of the light emitting unit is grouped into at least one element group arranged in a first direction, the element group includes a plurality of sub element groups arranged to be spaced apart from each other by a first distance in the first direction and electrically connected to each other, and the sub element group includes at least one light emitting element arranged in a second direction intersecting the first direction.

The sub element group is spaced apart from a sub element group belonging to other element group included in the light emitting unit by a second distance in the first direction and is alternately arranged.

The light emitting unit is arranged adjacent to each other in the second direction, and the sub element group is arranged at a different position from a sub element group included in other light emitting unit based on the first direction.

The controller controls the at least one element group included in the light emitting unit to sequentially emit light, and controls the light emitting element included in the same element group to emit light simultaneously.

The second distance is shorter than the first distance.

The light emitting unit includes a plurality of light emitting elements arranged in a second direction, and is arranged adjacent in a first direction intersecting the second direction, and the first direction is a direction parallel to a base line connecting center positions of the light emitting device and the sensor device.

The first optical member replicates the light emitted from the at least one light emitting unit into a plurality of line pattern lights spaced apart in the first direction.

The controller controls the at least one light emitting unit to emit light sequentially, and controls the light emitting element included in the same light emitting unit to emit light simultaneously.

The optical device further includes an actuator which is attached to the first optical member to move the first optical member.

The controller sequentially moves the actuator by a preset distance in a first direction parallel to a base line connecting center positions of the light emitting device and the sensor device.

The controller, whenever the actuator moves, controls the first light emitting device and the sensor device to acquire partial depth information of the target area, and acquires depth information of the target area, based on a plurality of the acquired partial depth information.

The first light emitting device further includes a second optical member for changing a path of light emitted from the light emitting unit or changing an angle of view, and the second optical member is positioned between the light emitting unit and the first optical member.

The first optical member is a diffractive optical element, and the second optical member includes at least one or more lenses or at least one or more diffractive optical elements.

The optical device further includes a second light emitting device that emits surface light over the entire target area, wherein the at least one sensor device detects a second received light, which is the emitted surface light, that is reflected from the target area, and the controller generates a two-dimensional image based on the detected second received light.

The controller generates a depth image by using the acquired depth information, or generates a depth image by synthesizing the acquired depth information and the generated two-dimensional image.

A distance between the plurality of line pattern lights is greater than or equal to a maximum pixel parallax distance.

The sensor device includes an asynchronous type sensor device or a frame type sensor device for sensing pixel-based data, and the controller controls the sensor device so that the sensor device operates in synchronization with a point of time when the light emitting element emits light.

BRIEF DESCRIPTION OF THE DRAWINGS

The above and other objects, features and advantages of the present disclosure will be more apparent from the following detailed description in conjunction with the accompanying drawings, in which:

FIG. 1 is a diagram illustrating an outer shape of a mobile terminal as an example of an electronic apparatus according to an embodiment of the present disclosure;

FIG. 2 is a block diagram of the mobile terminal of FIG. 1;

FIG. 3A is a diagram illustrating an optical device according to an embodiment of the present disclosure;

FIG. 3B is a diagram illustrating an optical device according to another embodiment of the present disclosure;

FIGS. 4A to 4B are diagrams for explaining calculation of a parallax distance of the optical device of FIG. 3;

FIG. 5A to 5B are diagrams for explaining an example in which a second optical member is included in the optical device of FIG. 3;

FIG. 6 is a diagram illustrating an example in which a second light emitting device is included in the optical device of FIG. 3;

FIGS. 7A to 7B are diagrams illustrating an example of a first light emitting device included in the optical device of FIG. 3;

FIGS. 8A to 8C are diagrams illustrating an example of an electrical connection structure and a circuit disposition structure of the first light emitting device of FIG. 7;

FIGS. 9 to 10 are diagrams illustrating another example of a first light emitting device included in the optical device of FIG. 3;

FIGS. 11A and 11B are diagrams illustrating that an optical device including the first light emitting device of FIG. 7 emits pattern light to a target area;

FIGS. 12A to 14 are diagrams for explaining FIG. 11;

FIG. 15 is a diagram illustrating another example of a first light emitting device included in the optical device of FIG. 3;

FIG. 16 is a diagram illustrating that an optical device including the first light emitting device of FIG. 15 emits pattern light to a target area;

FIGS. 17A to 17C are diagrams for explaining FIG. 16;

FIG. 18 is a diagram illustrating an example of an actuator included in the optical device of FIG. 3;

FIG. 19 is a diagram for explaining FIG. 18; and

DETAILED DESCRIPTION OF THE PREFERRED EMBODIMENTS

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

Although the terms "first," "second," etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

An electronic apparatus described in the present specification is mainly described with a mobile terminal as an example for convenience, but is not limited thereto. Here, the electronic apparatus may include a vehicle video device such as a black box, a Closed Caption TV (CCTV), a mobile terminal, a robot cleaner, and the like. The mobile terminal may include a mobile phone, a smart phone, a notebook computer, a digital broadcasting terminal, a personal digital assistant (PDA), a navigation device, a tablet PC, a wearable device, and the like.

FIG. 1 is a diagram illustrating an outer shape of a mobile terminal as an example of an electronic apparatus according to an embodiment of the present disclosure. FIG. 1A is a front view of the mobile terminal, FIG. 1B is a side view, FIG. 1C is a rear view, and FIG. 1D is a bottom view.

Referring to FIG. 1, a case forming an outer shape of a mobile terminal 100 is formed by a front case 100-1 and a rear case 100-2. Various electronic components may be embedded in a space formed by the front case 100-1 and the rear case 100-2.

Specifically, a display 180, a first camera device 195a, a first sound output module 153a, and the like may be disposed in the front case 100-1. Further, a first to second user input units 130a and 130b may be disposed in a side surface of the rear case 100-2.

In the display 180, touch pads are overlapped in a layer structure, so that the display 180 can operate as a touch screen.

The first sound output module 153a may be implemented in the form of a receiver or speaker. The first camera device 195a may be implemented in a form suitable for photographing an image or video of a user or the like. In addition, a microphone 123 may be implemented in a form suitable for receiving user's voice or other sound.

The first to second user input units 130a and 130b and a third user input unit 130c described later may be collectively referred to as a user input unit 130.

A first microphone (not shown) may be disposed in the upper side of the rear case 100-2, i.e., in the upper side of the mobile terminal 100, so as to collect an audio signal, and a second microphone 123 may be disposed in the lower side of the rear case 100-2, i.e., in the lower side of the mobile terminal 100, so as to collect an audio signal.

A second camera device 195b, a third camera device 195c, a flash 196, and the third user input unit 130c may be disposed in the rear surface of the rear case 100-2.

The second and third camera devices 195b and 195c may have a photographing direction that is substantially opposite to that of the first camera device 195a, and may have pixels different from those of the first camera device 195a. The second camera device 195b and the third camera device 195c may have a different angle of view to expand a photographing range. A mirror (not shown) may be additionally disposed adjacent to the third camera device 195c. In addition, another camera device may be further installed adjacent to the third camera device 195c to be used for photographing a 3D stereoscopic image or to be used for an additional photographing with a different angle of view.

The flash 196 may be disposed adjacent to the third camera 195c. When a subject is photographed by the third camera 195c, the flash 196 illuminates light toward the subject.

A second sound output module 153b may be additionally disposed in the rear case 100-2. The second sound output module may implement a stereo function together with the first sound output module 153a, and may be used for a call in a speaker phone mode.

A power supply unit (not shown) for supplying power to the mobile terminal 100 may be mounted in the rear case 100-2 side. The power supply unit 190, for example, as a rechargeable battery, may be configured integrally with the rear case 100-2, or may be detachably coupled to the rear case 100-2 for charging or the like.

FIG. 2 is a block diagram of the mobile terminal of FIG. 1.

Referring to FIG. 2, the mobile terminal 100 may include a wireless communication unit 110, an audio/video (A/V) input unit 120, a user input unit 130, a sensing unit 140, an output unit 150, a memory 160, an interface unit 175, a terminal controller 170, and a power supply unit 190. When such components are implemented in an actual application, if necessary, two or more components may be combined into a single component, or a single component may be subdivided into two or more components.

The wireless communication unit 110 may include a broadcast receiving module 111, a mobile communication module 113, a wireless Internet module 115, a short range communication module 117, a GPS module 119, and the like.

The broadcast receiving module 111 may receive at least one of a broadcast signal and broadcast related information from an external broadcast management server through a broadcast channel. The broadcast signal and/or broadcast-related information received through the broadcast receiving module 111 may be stored in the memory 160.

The mobile communication module 113 may transmit and receive a wireless signal with at least one of a base station, an external terminal, and a server on a mobile communication network. Here, the wireless signal may include a voice call signal, a video call signal, or various types of data according to transmission/reception of text/multimedia message.

The wireless Internet module 115 refers to a module for wireless Internet access, and the wireless Internet module 115 may be embedded in the mobile terminal 100 or may be external to the mobile terminal 100.

The short-range communication module 117 refers to a module for short-range communication. As a short-range communication technology, Bluetooth, Radio Frequency Identification (RFID), infrared data association (IrDA), Ultra Wideband (UWB), ZigBee, Near Field Communication (NFC), and the like can be used.

The Global Position System (GPS) module 119 receives location information from a plurality of GPS satellites.

The Audio/Video (A/V) input unit 120 is implemented for inputting an audio signal or a video signal, and may include a camera device 195, a microphone 123, and the like.

The camera device 195 may process an image frame such as a still image or a video acquired by an image sensor in a video call mode or a photographing mode. In addition, the processed image frame may be displayed on the display 180.

The image frame processed by the camera device 195 may be stored in the memory 160 or transmitted to the outside through the wireless communication unit 110. Two or more camera devices 195 may be provided depending on the configuration aspect of the electronic apparatus.

The microphone 123 may receive an external audio signal by a microphone in a display off mode, for example, a call mode, a recording mode, a voice recognition mode, or the like, and process the audio signal as electrical voice data.

Meanwhile, a plurality of microphones 123 may be disposed in different positions. The audio signal received from each microphone may be processed by the terminal controller 170 or the like.

The user input unit 130 generates key input data input by a user to control the operation of an electronic apparatus. The user input unit 130 may be composed of a key pad, a dome switch, a touch pad (resistive type/capacitive type), etc., through which commands or information can be inputted by a user's pressing or touching operation. In particular, when the touch pad forms a mutual layer structure with the display 180 described later, this may be referred to as a touch screen.

The sensing unit 140 may generate a sensing signal for controlling the operation of the mobile terminal 100 by detecting the current state of the mobile terminal 100, such as an open/closed state of the mobile terminal 100, a location of the mobile terminal 100, and a contact of user.

The sensing unit 140 may include a proximity sensor 141, a pressure sensor 143, a motion sensor 145, a touch sensor 146, and the like.

The proximity sensor 141 may detect an object approaching the mobile terminal 100, or the presence of an object existing in the vicinity of the mobile terminal 100 without mechanical contact. In particular, the proximity sensor 141 may detect a proximity object, by using a change in an AC magnetic field or a change in a static magnetic field, or by using a rate of change of capacitance.

The pressure sensor 143 may detect whether pressure is applied to the mobile terminal 100 and the magnitude of the pressure.

The motion sensor 145 may detect the position or movement of the mobile terminal 100 by using an acceleration sensor, a gyro sensor, or the like.

The touch sensor 146 may detect a touch input by a user's finger or a touch input by a specific pen. For example, when a touch screen panel is disposed in the display 180, the touch screen panel may include a touch sensor 146 for sensing location information, intensity information, and the like of a touch input. The sensing signal detected by the touch sensor 146 may be transmitted to the terminal controller 170.

The output unit 150 is implemented for outputting an audio signal, a video signal, or an alarm signal. The output unit 150 may include a display 180, an audio output module 153, an alarm unit 155, and a haptic module 157.

The display 180 displays and outputs information processed by the mobile terminal 100. For example, when the mobile terminal 100 is in a call mode, a user interface (UI) or a graphical user interface (GUI) related to a call is displayed. In addition, when the mobile terminal 100 is in a video call mode or a photographing mode, the photographed or received images may be displayed individually or simultaneously, and a UI and a GUI are displayed.

Meanwhile, as described above, when the display 180 and the touch pad form a mutual layer structure to form a touch screen, the display 180 may be used as an input device capable of inputting information by a user's touch as well as an output device.

The sound output module 153 may output audio data received from the wireless communication unit 110 or stored in the memory 160 in a call signal reception, a call mode or a recording mode, a voice recognition mode, a broadcast reception mode, and the like. In addition, the sound output module 153 outputs audio signals, e.g., a call signal reception sound, a message reception sound, and the like, related to functions performed by the mobile terminal 100. The sound output module 153 may include a speaker, a buzzer, and the like.

The alarm unit 155 outputs a signal for notifying the occurrence of an event in the mobile terminal 100. The alarm unit 155 outputs a signal for notifying the occurrence of an event in a form other than an audio signal or a video signal. For example, a signal can be output in the form of vibration.

The haptic module 157 generates various tactile effects that the user can feel. A typical example of the tactile effect generated by the haptic module 157 is a vibration effect. When the haptic module 157 generates vibration through a tactile effect, the intensity and pattern of the vibration generated by the haptic module 157 can be converted, and different vibrations may be synthesized to be output or may be sequentially output.

The memory 160 may store a program for processing and control of the terminal controller 170, or may perform a function for temporary storage of input or output data (e.g. phonebook, message, still image, video, etc.).

The interface unit 175 serves as an interface with all external devices connected to the mobile terminal 100. The interface unit 175 may receive data from an external device or receive power to transmit to each component inside the mobile terminal 100, and transmit data inside the mobile terminal 100 to an external device.

The mobile terminal 100 may be provided with a fingerprint recognition sensor for recognizing a user's fingerprint, and the terminal controller 170 may use fingerprint information sensed through the fingerprint recognition sensor as an authentication means. The fingerprint recognition sensor may be embedded in the display 180 or the user input unit 130.

The terminal controller 170 typically controls the operation of each unit to control the overall operation of the mobile terminal 100. For example, the terminal controller 170 may perform related control and processing for voice call, data communication, video call, and the like. In addition, the terminal controller 170 may include a multimedia playback module 181 for playing multimedia. The multimedia playback module 181 may be configured as hardware in the terminal controller 170 or may be configured as software separately from the terminal controller 170.

Meanwhile, the terminal controller 170 may include an application processor (not shown) for driving an application. Alternatively, the application processor (not shown) may be provided separately from the terminal controller 170.

In addition, the power supply unit 190 may receive external power and internal power under the control of the terminal controller 170 to supply power required for operation of each component.

The power supply unit 190 may have a connection port, and an external charger supplying power for charging a battery may be electrically connected to the connection port. Meanwhile, the power supply unit 190 may be configured to charge the battery in a wireless manner without using the connection port.

FIG. 3A is a diagram illustrating an optical device according to an embodiment of the present disclosure.

Referring to the drawing, the optical device 10 according to an embodiment of the present disclosure may include a controller 600, a first light emitting device 200, and a sensor device 400.

The first light emitting device 200 may emit a plurality of pattern lights spaced apart from each other to a target area. To this end, the first light emitting device 200 may include a light emitting controller 210, a first optical member 230, and at least one light emitting unit 220.

The light emitting unit 220 may include at least one light emitting element that emits output light of a specific wavelength. For example, the light emitting element may emit infrared ray. Specifically, the light emitting element may emit infrared light having a wavelength of 940 nm or 850 nm.

The light emitting element included in the light emitting unit 220 may be a laser diode that converts an electrical signal into an optical signal. The light emitting element may output light in the form of a pulse under the control of the light emitting controller 210.

The light emitting controller 210 may provide information related to the light emission operation of the light emitting element to the controller 600. Specifically, the light emitting controller 210 may provide the controller 600 with first timestamp information including time point information at which light is emitted as the light emitting element is turned on.

The first optical member 230 may generate a light emitted from at least one light emitting unit 220 as at least one pattern light. The first optical member 230 may convert the light emitted from at least one light emitting unit 220 into line-shaped pattern light, or may convert and replicate into a plurality of line-shaped pattern light. Accordingly, power consumption of the first light emitting device 200 may be reduced.

For example, the first optical member 230 may be a diffractive optical element (DOE).

The diffractive optical element is an optical element capable of converting input light into line-shaped light, or replicating and outputting input light into a plurality of identical pieces of light. The shape of the replicated light and the number of the light may vary depending on the shape of the diffractive optical element.

The first light emitting device 200 including the first optical member 230 may simultaneously emit a plurality of line pattern lights spaced apart from each other through a target area. The plurality of line pattern lights may be emitted from the light emitting device 200 to have the same distance from each other. The spaced distance between each line pattern may be set to be a certain value or more. The spaced distance between line patterns may be greater than or equal to a maximum pixel parallax distance.

The line pattern light may be a linear pattern formed in a y-axis direction perpendicular to a direction parallel to the base line BL connecting the positions of the light emitting device 200 and the sensor device 400, on a plane (hereinafter referred to as 'xy plane') perpendicular to the direction in which the line pattern light is emitted. Alternatively, the line pattern light may be a curve or an arbitrary pattern formed in an arbitrary direction crossing the x-axis direction. Alternatively, the line pattern light may be at least one line dot pattern light in which a plurality of dots form a straight line.

The sensor device 400 may detect a received light, which is the pattern light emitted from the first light emitting device 200, reflected from the target area. The received light is light that is received by reflecting the emitted pattern light from the target area. The sensor device 400 may be disposed to face the same direction as the light emission direction of the first light emitting device 200.

The sensor device 400 may include a sensor controller 410, a sensor 420, a filter 430, a lens 440, and an aperture 450.

The aperture 450 opens and closes the light incident on the lens 440 to adjust the amount of incident light.

The lens 440 condenses the light incident through the aperture 450 into the sensor 420.

The filter 430 may pass only light of a specific wavelength through the sensor 420 among the received light. The light of a specific wavelength may be infrared rays. Accordingly, the filter 430 may be a band pass filter that transmits infrared rays. Specifically, the filter 430 may be a filter capable of passing infrared light having a wavelength of 940 nm or 850 nm. However, the filter 430 is not limited thereto, and may be various types of filters such as a broad band filter and a dual band pass filter.

The sensor 420 may detect received light of a specific wavelength that has passed through the filter 430 among received light corresponding to the output light.

Meanwhile, the sensor 420 may be an asynchronous sensor that senses pixel-based data.

The sensor 420 may output an event signal whenever the change amount in the received light incident on a specific pixel becomes greater than or equal to a set value. Therefore, as the change amount in the received light increases, the number of times the event signal output from the sensor 420 is output may increase.

The sensor controller 410 may transmit event signal information output from the sensor 420 to the controller 600, and the controller 600 may transmit the received event signal information to the light emitting controller 210. In addition, the sensor controller 410 receives output light emission period information of the light emitting unit 220 from the light emitting controller 210 through the controller 600, and may control the operation of the sensor 420 so that the sensor 420 is activated in synchronization with an ON period of the light emitting element of the light emitting unit 220.

The sensor controller 410 may control the sensor 420 so that the operation period of the sensor 420 includes the ON period of the light emitting element of the light emitting unit 220. The length of the operation section of the sensor 420 may be determined by the performance or the like of the photodiode formed in the sensor 420.

Accordingly, when the sensor 420 is an asynchronous sensor, the operation or sensing timing of the sensor 420 may be synchronized with the operation or light emission timing of the light emitting unit 220.

Meanwhile, the sensor 420 may be a general frame type sensor.

In this case, the sensor 420 may output only magnitude information of the received light incident on a specific pixel. The sensor controller 410 may receive an output value for each pixel sensed by the sensor 420 during a plurality of frames from the frame-type sensor 420, and derive a difference in the output value for each pixel for the front and rear frames. The sensor controller 410 may determine that an event signal has occurred whenever the magnitude of the derived difference value becomes greater than or equal to a set value.

The controller 600 may control the operation of the light emitting device 200 and the sensor device 400 through the light emitting controller 210 and the sensor controller 410. Meanwhile, the controller 600 may include both the light emitting controller 210 and the sensor controller 410, and the operation of the light emitting device 200 and the sensor device 400 may be directly controlled through the controller 600.

Meanwhile, when the optical device 10 is embedded in the mobile terminal 100, the controller 600 may be included in the terminal controller 170, and the terminal controller 170 may control all configurations of the optical device 10.

The controller 600 may calculate a parallax distance by comparing the detected pattern of received light with a reference pattern, and acquire depth information of the target area by using the calculated parallax distance. The configuration related to depth information acquisition will be described in detail later with reference to FIGS. 4A and 4B.

The controller 600 may synchronize the operation of the sensor device 400 and the first light emitting device 200. Specifically, the controller 600 may receive, from the light emitting controller 210, first time stamp information including time point information at which the light emitting element of the light emitting unit 220 is turned on to emit light.

The controller 600 may transmit the received first time stamp information to the sensor controller 410. The sensor controller 410 may control the sensor 420 to operate in synchronization with the ON period of the light emitting element, based on the first time stamp information received from the controller 600.

In addition, the controller 600 may receive, from the sensor controller 410, second time stamp information including time point information at which a corresponding data is sensed together with pattern data of the received light sensed by the sensor 420. The controller 600 may match and store the pattern data of the received light, the second time stamp information, and the like in a storage unit (not shown), and derive depth information of the target area by using the stored information.

Meanwhile, the controller 600 may control the intensity of output light output from the light emitting element of the light emitting unit 220. The controller 600 may control the first light emitting device 200 so that the intensity of the output light output from the light emitting element is equal to or greater than a set value. This is because when the intensity of the output light is less than or equal to the set value, the sensor 420 cannot output the event signal according to the received light corresponding to the pattern light.

Meanwhile, the controller 600 may receive the received light data detected by the sensor device 400, and may control the first light emitting device 200 to change at least one or more of the output light emission period or the output light emission intensity of the light emitting element of the light emitting unit 220 according to the change amount in the received light. Here, the change amount means the change amount in luminance or the change amount in light intensity.

For example, when the change amount of the received light is a first change amount, the controller 600 may control the output light to be output with a first emission intensity, and when the change amount of the received light is a second change amount greater than the first change amount, may control the output light to be output with a second emission intensity smaller than the first emission intensity. Accordingly, the controller 600 may adaptively adjust the emission intensity of the output light of the optical device 10 according to the presence of various light sources in the surrounding environment, and increase the accuracy of depth information.

Meanwhile, the controller 600 may control the first light emitting device 200 to vary an output light emission period of the light emitting element of the light emitting unit 220, based on movement information of the optical device 10. For example, when the mobile terminal 100 including the optical device 10 is mounted in a moving vehicle such as a car, a robot, a drone, etc., the controller 600 may vary the emission period of the output light of the light emitting device 220 based on movement information of the mobile terminal 100.

Meanwhile, when the electronic apparatus including the optical device 10 is a fixed device such as a CCTV, or in a fixed state, the controller 600 may control the first light emitting device 200 to vary the output light emission period of the light emitting element in consideration of only the movement speed of an object.

FIG. 3B is a diagram illustrating an optical device 20 according to another embodiment of the present disclosure.

Referring to the drawing, the optical device 20 according to another embodiment of the present disclosure includes the controller 600, the first light emitting device 200, the first sensor device 400, and a second sensor device 500.

The first light emitting device 200 and the first sensor device 400 have the same configuration as the light emitting device 200 and the sensor device 400 of the optical device 10 illustrated in FIG. 3A. Accordingly, in this description, only the control operation of the second sensor device 500 and the controller 600 will be described.

The second sensor device 500 may be the same sensor device as the first sensor device 400. The second sensor device 500 may be positioned in a straight line with the light emitting device 200 and the first sensor device 400, and may be disposed to face the same direction as the light emitting direction of the first light emitting device 200.

The second sensor device 500 and the first sensor device 400 may be disposed in a position symmetrical to each other with respect to the first light emitting device 200. The distances between the second sensor device 500 and the first sensor device 400, and the first light emitting device 200 may be the same. However, the positions of the second sensor device 500 and the first sensor device 400 are not limited thereto, the spaced distances may be different from each other, and both the second sensor device 500 and the first sensor device 400 may be positioned in one side of the first light emitting device 200.

The second sensor device 500 may detect a received light, which is the pattern light of a specific wavelength emitted from the first light emitting device 200, that is is reflected from the target area. The second sensor device 500 may include a second sensor controller 510, a second sensor 520, a filter 530, a second lens 540, and a second aperture 550.

The second sensor 520 may detect received light having a specific wavelength that has passed through the filter 530 among received light corresponding to the output light. As the second sensor 520, the same sensor as the first sensor 420 of the first sensor device 400 may be used. The second sensor 520 may be an asynchronous type sensor that senses pixel-based data or a general frame type sensor.

The controller 600 may control the operation of the first light emitting device 200, the first sensor device 400, and the second sensor device 500 through the first sensor controller 410 and the second sensor controller 510. Meanwhile, the controller 600 may include all of the light emitting controller 210, the first sensor controller 410, and the second sensor controller 510, and the operations of the first light emitting device 200, the first sensor device 400, and the second sensor device 500 may be directly controlled through the controller 600.

Meanwhile, when the optical device 20 is embedded in the mobile terminal 100, the controller 600 may be included in the terminal controller 170, and the terminal controller 170 may control all configurations of the optical device 20.

The controller 600 may calculate a parallax distance by comparing a first pattern detected by the first sensor device 400 with a second pattern detected by the second sensor device 500, and acquire the depth information of the target area by using the calculated parallax distance.

Meanwhile, the controller 600 may compare a first pattern detected by the first sensor device 400 with a reference pattern to calculate parallax distance, and may correct the calculated parallax distance by using the result of comparing a second pattern detected by the second sensor device 500 with the reference pattern. The controller 600 may acquire depth information of the target area based on the corrected parallax distance information. The configuration related thereto will be described later in detail with reference to FIGS. 4A and 4B.

The controller 600 may synchronize operations of the first sensor device 400, the second sensor device 500, and the first light emitting device 200. Specifically, the controller 600 may receive, from the light emitting controller 210, first time stamp information including time point information at which the light emitting element of the light emitting unit 220 is turned on to emit light.

The controller 600 may transmit the received first time stamp information to the first sensor controller 410 and the second sensor controller 510. The first sensor controller 410 and the second sensor controller 510 may control the first sensor 420 and the second sensor 520 to operate in synchronization with the ON period of the light emitting element of the light emitting unit 220, based on the first time stamp information received from the controller 600.

In addition, the controller 600 may receive second time stamp information of corresponding data together with the data sensed by the first sensor 420 and the second sensor 520 from the first sensor controller 410 and the second sensor controller 510. The controller 600 may store sensing data, second time stamp information, and the like in a storage unit (not shown), and may derive depth information by using the stored information.

Meanwhile, the controller 600 may control the intensity of output light output from the light emitting element of the light emitting unit 220. The controller 600 may control the first light emitting device 200 so that the intensity of the output light output from the light emitting element becomes equal to or greater than a set value.

FIG. 4A is a diagram for explaining a parallax distance calculation of the optical device 10 of FIG. 3A.

Referring to the drawing, the first light emitting device 200 emits pattern light OB1 in a direction or angle V1 toward a target area. For example, V1 may be a direction (hereinafter referred to as "z-axis direction") perpendicular to a direction (x-axis direction) parallel to a base line BL connecting the positions of the first light emitting device 200 and the sensor device 400.

The emitted pattern light OB1 may be irradiated to a first object A1, a second object A2, and a third object A3 located at different distances from the first light emitting device 200.

Pattern light reflected from each of the objects A1, A2, and A3 may be incident on the sensor device 400 in the direction or angle of V2. The received light received by the sensor device 400 may be sensed by the sensor 420 through the aperture 450, the lens 440, and the filter 430.

The pattern light OB1 emitted from the light emitting device 200 may be formed of at least one line pattern light having a linear shape. Alternatively, the pattern light OB1 may be formed of at least one line dot pattern light in which a plurality of dots form a straight line. The controller 600 may designate the pattern light OB1 as a reference pattern.

The pattern light may be formed to achieve a straight line shape formed in a direction (y-axis direction) perpendicular to a direction (x-axis direction) parallel to the base line BL connecting the positions of the light emitting device 200 and the sensor device 400. However, the pattern light OB1 is not limited thereto, and may be a curve or an arbitrary pattern formed in an arbitrary direction intersecting the x-axis direction, on a plane (xy plane) perpendicular to the direction in which the pattern light OB1 is emitted.

Here, the parallax distance may be defined as a difference between the x-axis coordinates of the pattern of the pattern light OB1 and the received light, at the same y coordinate.

The pattern of the received light reflected from the object located at an infinite distance from the first light emitting device 200 and the sensor device 400 has a parallax distance close to zero. In addition, as the distance between the first light emitting device 200 and the sensor device 400, and the object becomes closer, the parallax distance increases. The controller 600 may match the distance information between the first light emitting device 200 and the object or the distance information between the sensor device 400 and the object with parallax distance information of the received light pattern, and store as reference distance data in the storage unit. The controller 600 may compare the parallax distance information for each pixel derived from the measured pattern of received light with stored reference distance data to calculate depth information of the target area.

Meanwhile, the relationship between the parallax distance and the distance information of the object may vary according to the spaced distance between the first light emitting device 200 and the sensor device 400. Accordingly, when the spaced distance between the first light emitting device 200 and the sensor device 400 is not fixed, the controller 600 may match the parallax distance, the distance information of the object, and the spaced distance information between the first light emitting device 200 and the sensor device 400 together and store as reference distance data. The controller 600 may compare the parallax distance information for each pixel derived from the measured received light pattern and the spaced distance information between the first light emitting device 200 and the sensor device 400 with the stored reference distance data, and calculate depth information of a target area.

The pattern OB2 of the received light detected by the sensor device 400 may have a different shape from the pattern light OB1 emitted from the first light emitting device 200.

The first pattern OB2a reflected from the first object A1 located at a relatively closest distance to the first light emitting device 200 and the sensor device 400 has the parallax distance D1 that becomes largest in the x-axis direction in comparison with the original position of the pattern light OB1. On the other hand, the third pattern OB2c reflected from the third object A3 located at a relatively farthest distance from the first light emitting device 200 and the sensor device 400 has the parallax distance D3 that becomes smallest in the x-axis direction in comparison with the original position of the pattern light OB1.

Since the pattern light irradiated to the object has a linear shape, the controller 600 may search for a pattern of the received light having the same y-coordinate as a specific y-coordinate of the pattern light OB1, and derive the parallax distance in the x-axis direction by comparing the x-coordinate of a corresponding pattern and the original x-coordinate of the pattern light OB1. The controller 600 sequentially may derive the parallax distance in the x-axis direction from the y-coordinate at the bottom of the pattern light OB1 to the y-coordinate at the top, and may derive depth information of the target area located in the y-coordinates to which the pattern light is irradiated, based on the derived parallax distance information.

The controller 600 may acquire the x-coordinate of the pattern OB2 of the received light for each y-coordinate of the pattern light OB1, with respect to the objects A1, A2, and A3 shown in FIG. 4A, and may derive the parallax distance D1 of a first object A1, the parallax distance D2 of a second object A2, and the parallax distance D3 of a third object A3.

The controller 600 may compare the derived D1, D2, D3 with reference data stored in the storage unit, and derive the depth information of the first object A1, the second object A2, and the third object A3 corresponding to the portion irradiated with the pattern light OB1. Accordingly, the parallax distance and depth information may be effectively calculated from the received light, which is the linear pattern light, reflected from the object.

In order to derive depth information of the entire target area, the controller 600 may control the first light emitting device 200 to continuously and repeatedly emit the pattern light OB1.

Meanwhile, in the emitted pattern light OB1, a plurality of line patterns having different x-coordinates may be simultaneously emitted to the target area. In this case, the distance in the x-axis direction between each line pattern may be set to be a certain value or more. In addition, the emitted pattern light OB1 may be repeatedly emitted to the target area so that the x-coordinate changes continuously.

The configuration related to the replication and continuous emission of the pattern light OB1 will be described later in detail with reference to FIGS. 11 to 14, 16 and 17.

Meanwhile, in order to calculate a parallax distance, the controller 600 may compare the second time stamp information matched with the pattern data of the received light with the first time stamp information of the light emitting device of the light emitting unit 220. The controller 600 may derive parallax distance and depth information by comparing the pattern light OB1 data and the pattern data of the received light having the same time stamp value or a difference between the time stamp values that is within a certain range.

The controller 600 may derive the parallax distance and depth information through the time stamp and only x, y coordinate comparison. Accordingly, the amount of calculation required for deriving depth information may be reduced.

Meanwhile, the controller 600 may generate a depth image of the entire target area by using the derived depth information, and may output the depth image through a display unit of an electronic apparatus including an optical device or an external electronic apparatus connected to the optical device.

Meanwhile, the sensor device 400, 500 may include a calculation unit (not shown), and the calculation unit of each sensor device 400, 500 may calculate the parallax distance and depth information, so that a depth image of the entire target area can be generated by using the calculated depth information.

FIG. 4B is a diagram for explaining calculation of a parallax distance of the optical device 20 of FIG. 3B.

Operations related to the first light emitting device 200 and the first sensor device 400 are the same as those described in connection with FIG. 4A. Therefore, in this description, only the second sensor device 500 and an operation associated therewith will be described.

Referring to the drawing, the pattern light reflected from each of the objects A1, A2, and A3 may be incident on the first sensor device 400 in a direction or angle of V2, and may be incident on the second sensor device 500 in the direction or angle of V3. The received light received from the first sensor device 400 and the second sensor device 500 may be sensed by a sensor through an aperture, a lens, and a filter, respectively.

The first received light pattern OB2 detected by the first sensor device 400 and the second received light pattern OB3 detected by the second sensor device 500 may have a different shape from the pattern light OB1 emitted from the first light emitting device 200.

The controller 600 may search the first received light pattern OB2 and the second received light pattern OB3 having the same y-coordinate as a specific y-coordinate of the pattern light OB1, and derive a parallax distance. The controller 600 may sequentially derive the parallax distance in the x-axis direction from the y-coordinate at the bottom of the pattern light to the y-coordinate at the top, and may derive depth information of a target area located at y-coordinates irradiated with the pattern light, based on the derived parallax distance information.

With respect to the objects A1, A2, and A3 shown in FIG. 4B, the controller 600 may acquire the x-coordinate of the first received light pattern OB2 and the x-coordinate of the second received light pattern OB3 for each y-coordinate of the pattern light OB1, and may derive D1 to D6.

The controller 600 may calculate the sum of the derived D1 and D4 as the parallax distance of the first object A1, calculate the sum of D2 and D5 as the parallax distance of the second object A2, and calculate the sum of D3 and D6 as the parallax distance of the third object A3. Here, the parallax distance may be defined as a difference between the x-axis coordinates of the first received light pattern OB2 and the second received light pattern OB3 in the same y-coordinate.

The controller 600 may compare the derived parallax distance with reference data stored in the storage unit, and derive the depth information of the first object A1, the second object A2, and the third object A3 corresponding to the portion to which the pattern light OB1 is irradiated. Accordingly, the parallax distance and depth information can be effectively calculated from the received light, which is the linear pattern light, reflected from the object.

Meanwhile, the controller 600 may calculate D1 and D4 as the first parallax distance and the second parallax distance of the first object A1, respectively, calculate D2 and D5 as the first parallax distance and the second parallax distance of the second object A2, respectively, and calculate D3 and D6 as the first parallax distance and the second parallax distance of the third object A3, respectively. In this case, the first parallax distance may be defined as a difference between the x-axis coordinates of the first received light pattern OB2 and the pattern light OB1, in the same y-coordinate, and the second parallax distance may be defined as a difference between the x-axis coordinates of the second received light pattern OB3 and the pattern light OB1, in the same y-coordinate.

In this case, the controller 600 may derive depth information of the first object A1 by comparing D1 and D4 with the first reference data and the second reference data stored in the storage unit, respectively, derive depth information of the second object A2 by comparing D2 and D5 with the first and second reference data stored in the storage unit, respectively, and derive depth information of the third object A3 by comparing D3 and D6 with the first and second reference data stored in the storage unit, respectively.

Meanwhile, the sensor device 400, 500 may include a calculation unit (not shown), and the calculation unit of each sensor device 400, 500 may calculate the parallax distance and depth information, and create a depth image of the entire target area by using the calculated depth information.

FIG. 5A to 5B are diagrams for explaining an example in which a second optical member 240 is included in the optical device of FIG. 3.

Referring to FIG. 5A, the first light emitting device 200 may include a light emitting controller 210, a first optical member 230, and at least one light emitting unit 220, and may further include a second optical member 240.

The second optical member 240 may be positioned between the light emitting unit 220 and the first optical member 230. The second optical member 240 may change a path of light emitted from the light emitting unit 220 or change an angle of view.

Referring to FIG. 5B, the second optical member 240 may include at least one lens. Meanwhile, although not shown in the drawing, the second optical member 240 may include at least one diffractive optical element.

Meanwhile, the first optical member 230 may be a double-sided diffraction optical element. In this case, the second optical member 240 may not be included in the first light emitting device 200.

The second optical member 240 may convert pattern light into pattern light expanded in the x-axis direction or the y-axis direction. The second optical member 240 may convert the line pattern light so that the pattern light irradiated to the target area has a suitable angle of view in the x-axis direction and/or the y-axis direction.

Meanwhile, the second optical member 240 may change the traveling direction of the pattern light. The second optical member 240 may collimate the divergent light emitted from the light emitting unit 220 to convert into parallel light. The parallel light whose traveling direction is changed by the second optical member 240 may enter the first optical member 230. In this case, the angle of view in the x-axis direction and/or y-axis direction may be formed by the first optical member 230.

FIG. 6 is a diagram illustrating an example in which a second light emitting device 300 is included in the optical device of FIG. 3.

The optical device 10 includes a first light emitting device 200, and may further include a second light emitting device 300.

The operation of the first light emitting device 200 is the same as the content described in connection with FIGS. 3A and 3B. Accordingly, in this description, only the second light emitting device 300 and an operation associated therewith will be described.

Referring to the drawing, the second light emitting device 300 may include a second light emitting controller 310 and at least one second light emitting unit 320.

The second light emitting unit 320 may be a surface light source that emits a constant surface light over the entire target area. For example, the second light emitting unit 320 may include at least one light emitting diode (LED).

In this case, the first sensor device 400 and/or the second sensor device 500 may detect the second received light, which is the surface light emitted by the second light emitting device 300, that is reflected from the target area. The controller 600 may generate a 2D image based on the detected second received light.

The controller 600 may recognize a contour of an object existing in the target area or a face of a person, from the 2D image.

Meanwhile, the controller 600 may generate a depth image by synthesizing the 2D image with the acquired depth information.

The second light emitting controller 310 may operate in conjunction with the first light emitting controller 210 of the first light emitting device 200. For example, the second light emitting controller 310 may control the second light emitting unit 320 to emit light so that the second light emitting unit 320 emits light during the time when the first light emitting unit 220 of the first light emitting device 200 does not emit light.

Meanwhile, the second light emitting controller 310 may synchronize the operation or sensing timing of the first sensor device 400 and/or the second sensor device 500 with the operation or light emission timing of the second light emitting unit 320.

Meanwhile, the controller 600 may control operations of the first light emitting device 200 and the second light emitting device 300 through the first light emitting controller 210 and the second light emitting controller 310. The controller 600 may include both the first light emitting controller 210 and the second light emitting controller 310, and the operations of the first light emitting device 200 and the second light emitting device 300 may be directly controlled through the controller 600.

FIG. 7A is a diagram illustrating an example of the first light emitting device 200 included in the optical device of FIG. 3, and FIG. 7B is an enlarged view illustrating a part of the first light emitting device 200 of FIG. 7A.

Referring to FIGS. 7A and 7B simultaneously, the first light emitting device 200 may include at least one light emitting unit 220. The light emitting unit 220 may have a shape extending long in the x-axis direction. When there are a plurality of light emitting units 220, each of the light emitting units R1, R2, R3, and R4 may be arranged adjacent to each other in the y-axis direction. In this example, although it is illustrated that the number of the light emitting units 220 is four, the number of the light emitting units 220 is not limited thereto, and may be configured in various numbers.

Each of the light emitting units R1, R2, R3, and R4 may include at least one light emitting element. In each light emitting unit, the light emitting elements are grouped into at least one element group (Gr11, Gr12, Gr13, . . . ), and one element group may be grouped again into a plurality of sub-element groups (SGr111, SGr112, SGr113, . . . ). In this example, it is illustrated that within one light emitting unit, light emitting elements are grouped into three element groups, and each element group is grouped into five sub-element groups, but the number of element groups and sub-element groups is not limited thereto, and may be configured in various numbers.

Each of the sub-element groups (SGr111, SGr112, SGr113, . . . ) may include at least one light emitting element arranged in the y-axis direction. In this example, it is illustrated that three light emitting elements are included in one sub-element group, but the number of light emitting elements is not limited thereto, and the sub-element group may include various numbers of light emitting elements.

In one light emitting unit, all light emitting elements included in the same element group are electrically connected to each other through a conductive line or a circuit pattern. In addition, sub-element groups included in the same element group are arranged to be spaced apart from each other at equal intervals by a first distance Da in the x-axis direction, and are electrically connected to each other through a conductive line or a circuit pattern.

For example, in the first light emitting unit R1, the first sub-element group SGr111 and the second sub-element group SGr112 included in the first element group Gr11 are arranged to be spaced apart from each other by Da, and the second sub-element group SGr112 and the third sub-element group SGr113 are arranged to be spaced apart from each other by Da. All light emitting elements belonging to the first to fifth element groups (SGr111, SGr112, SGr113, . . . ) are electrically connected.

Meanwhile, at least one element group may be arranged in the x-axis direction within the light emitting unit. In this case, at least one element group may be arranged so that sub-element groups included in each element group are spaced apart from each other by a certain distance to be alternately positioned. Specifically, each sub-element group may be arranged to be spaced apart from a sub-element group belonging to other element group included in one light emitting unit at equal intervals by a second distance Db and located alternately.

For example, in the first light emitting unit R1, the light emitting elements of the first sub-element group SGr111 of the first element group Gr11 may be spaced apart from the light emitting elements of the first sub-element group SGr121 of the second element group Gr12 by Db and located adjacent to each other. The light-emitting elements of the first sub-element group SGr121 of the second element group Gr12 may be spaced apart from the light emitting elements of the first sub-element group SGr131 of the third element group Gr13 by Db and located adjacent to each other. In addition, the light emitting elements of the first sub-element group SGr131 of the third element group Gr13 may be spaced apart from the light emitting elements of the second sub-element group SGr112 of the first element group Gr11 by Db and located adjacent to each other.

Meanwhile, all sub-element groups included in a specific light emitting unit may be arranged at different positions from sub-element groups included in other light emitting unit based on the x-axis direction.

For example, referring to FIG. 7A, light emitting elements included in the first sub-element group SGr111 of the first element group Gr11 of the first light emitting unit R1 may be arranged to have different x-axis coordinates from the light-emitting elements included in all sub-element groups of the second to fourth light-emitting units R2 to R4. That is, all of the sub-element groups of the first to fourth light emitting units R1 to R4 may be arranged to have different x-axis coordinates.

Meanwhile, a distance between a sub-element group included in a specific light emitting unit and at least one sub-element group included in other light emitting unit in the x-axis direction may be a third distance Dc or a multiple of the third distance Dc.

For example, referring to FIG. 7A, light-emitting elements included in the first sub-element group SGr111 of the first light-emitting unit R1 may be arranged to be spaced apart from the light-emitting elements included in the first sub-element group SGr211 of the second light-emitting unit R2 by Dc in the x-axis direction, spaced apart from the light-emitting elements included in the first sub-element group SGr311 of the third light-emitting unit R3 by Dc in the x-axis direction, and spaced apart from the light-emitting elements included in the first sub-element group SGr411 of the fourth light-emitting unit R4 by 2*Dc in the x-axis direction.

However, the structure in which each sub-element group is arranged in the x-axis direction is not limited thereto, and the present disclosure may include all various embodiments in which all sub-element groups are all arranged at different positions based on the x-axis direction.

The first distance Da may be greater than the second distance Db, and the second distance Db may be greater than the third distance Dc. Meanwhile, the first distance Da may be a multiple of the second distance Db, and the second distance Db may be a multiple of the third distance Dc.

For example, when the number of light emitting units 220 is R and the number of element groups included in one light emitting unit is K, the first distance Da may be K times the second distance Db, and the second distance Db may be R times the third distance Dc.

Meanwhile, the light emitting element (p111a, p111b, p111c, p121a, . . . ) included in the light emitting unit 220 may be implemented in a form in which at least one vertical cavity surface emitting laser (VCSEL) is connected to or integrated on a circuit board (not shown).

Each light emitting element may have a diameter of 1 μm to 14 μm, and a maximum light output power of 15 mW.

The vertical cavity surface emitting laser light source is a light source used in an optical communication field, and has features of low cost, high temperature stability, and mass productivity. In addition, the vertical cavity surface emitting laser light source has advantages of high modulation speed, narrow radiation angle, low operating current, and high conversion efficiency. In addition, the vertical cavity surface emitting laser light source has the advantage of mass production by printing a plurality of highly efficient laser light sources on a semiconductor wafer in a pattern form.

Accordingly, the optical device according to an embodiment of the present disclosure may have advantages such as low cost, miniaturization, low power, high efficiency, and high stability, by using a vertical cavity surface emitting laser as a light emitting element.

FIGS. 8A to 8C are diagrams illustrating an example of an electrical connection structure and a circuit disposition structure of the first light emitting device 200 of FIG. 7.

Referring to FIG. 8A, in one light emitting unit, all light emitting elements included in the same element group are electrically connected to each other through a conductive line or the like. For example, light emitting elements included in each sub-element group of the first element group G11 of the first light emitting unit R1 are electrically connected to each other, and the sub-element groups may be electrically connected to each other by a pattern PtnA1 or the like. Similarly, all the light emitting elements of the second element group G12 may also be electrically connected to each other by a pattern PtnB1 or the like, and all the light emitting elements of the third element group G13 may also be electrically connected to each other by a pattern PtnC1 or the like.

Each of the light emitting elements may include an anode and a cathode, and an electric signal may be applied to the anode and the cathode of the light emitting element, so that the light emitting elements may operate to be turned on/off. Accordingly, light emitting elements included in the same element group may have an anode electrically connected to each other by a pattern or the like, and a cathode electrically connected to each other by a pattern or the like. Both the pattern connecting the anode and the pattern connecting the cathode may be formed in one surface of a die including the light emitting elements. Meanwhile, a pattern connecting the anode may be formed in one surface of the die, and a pattern connecting the cathode may be formed in the other surface of the die.

Referring to FIGS. 8B and 8C, at least one light emitting unit may be formed in one die. Patterns for electrically connecting each element group may be connected to a plurality of first pads Pad1 formed in the edge area of the die, respectively. The die including the light emitting unit may be mounted on a submount, and each of the plurality of first pads Pad1 may be electrically connected to a second pad Pad2 formed in the edge area of the submount. For example, the first pad and the second pad may be electrically connected through a conducting wire.

The second pad may be connected to an electric circuit located outside the submount or below the submount through a via formed to pass through the submount.

The submount may perform a heat dissipation role. Specifically, the submount may be formed to dissipate heat generated from a light emitting element included in a die mounted on the submount. Accordingly, the heat generated from the light emitting element can be effectively discharged through the submount, and the deterioration of the light emitting characteristics or reduction in luminous efficiency of the light emitting element due to heat can be minimized.

The first light emitting controller 210 or the controller 600 may control at least one element group included in the light emitting unit 220 to sequentially emit light, and control the light emitting elements included in the same element group to emit light simultaneously.

FIGS. 9 to 10 are diagrams illustrating another example of a first light emitting device 200 included in the optical device of FIG. 3.

Referring to FIG. 9, the first light emitting device 200 may include a plurality of light emitting units 220. The light emitting unit 220 may have a shape extending long in the x-axis direction. Each of the light emitting units R1, R2, R3, R4, . . . , and R12 may be arranged adjacent to each other in the y-axis direction. In this example, it is illustrated that the number of the light emitting units 220 is twelve, but the number of the light emitting units 220 is not limited thereto, and may be configured in various numbers.

Each of the light emitting units R1, R2, R3, R4, . . . , and R12 may include at least one light emitting element. Only one element group may be included in each light emitting unit. One element group may be grouped into a plurality of sub-element groups SGr11, SGr12, SGr13, SGr14, and SGr15. In this example, it is illustrated that one element group is grouped into five sub-element groups, within one light emitting unit, but the number of sub-element groups is not limited thereto, and may be configured in various numbers.

Since the disposition and electrical connection structure of the light emitting element in the sub-element group are the same as those of the embodiment shown in FIG. 7A, a detailed description thereof will be omitted.

The sub-element groups included in the same element group are arranged to be spaced apart from each other at equal intervals by a first distance Da in the x-axis direction, and are electrically connected to each other through a conductor or the like.

Sub-element group included in a specific light emitting unit may be arranged at a different position based on the x-axis direction from the sub-element group included in other light emitting unit.

Meanwhile, a distance between a sub-element group included in a specific light emitting unit and at least one sub-element group included in other light emitting unit in the x-axis direction may be a third distance Dc or a multiple of the third distance Dc.

However, the structure in which each sub-element group is arranged in the x-axis direction is not limited thereto, and the present disclosure may include all various embodiments in which all sub-element groups are all arranged at different positions based on the x-axis direction.

The first distance Da may be greater than the third distance Dc. Meanwhile, the first distance Da may be a multiple of the third distance Dc. For example, when the number of light emitting units 220 is R, the first distance Da may be R times the third distance Dc.

Referring to FIG. 10, the first light emitting device 200 may include one light emitting unit R1. The light emitting unit 220 may have a shape extending long in the x-axis direction.

The light emitting unit R1 may include at least one light emitting element. In each light emitting unit, the light emitting element may be grouped into at least one element group (Gr1, Gr2, Gr3, Gr12), and one element group may be grouped again into a plurality of sub-element groups (SGr011, SGr012, SGr013, . . . ). In this example, it is illustrated that the light emitting element is grouped into twelve element groups, and each element group is grouped into five sub-element groups, but the number of element group and sub-element group is not limited thereto, and may be configured of various numbers.

Since the disposition and electrical connection structure of the light emitting element in the sub-element group are the same as those of the embodiment shown in FIG. 7A, a detailed descriptions thereof will be omitted.

The light emitting elements included in the same element group are all electrically connected to each other through a conducting wire or the like. In addition, sub-element groups included in the same element group are arranged to be spaced apart from each other at equal intervals by a first distance Da in the x-axis direction, and are electrically connected to each other through a conducting wire or the like.

Meanwhile, at least one element group may be arranged in the x-axis direction within the light emitting unit. In this case, at least one element group may be arranged so that sub-element groups included in each element group are spaced apart from each other by a certain distance and alternately positioned. Specifically, each of the sub-element groups may be arranged to be spaced apart from other sub-element group by a third distance Dc and alternately positioned.

The first distance Da may be greater than the third distance Dc. Meanwhile, the first distance Da may be a multiple of the third distance Dc. For example, when the number of element groups is K, the first distance Da may be K times the third distance Dc.

FIG. 11A is a diagram illustrating that an optical device including the first light emitting device 200 of FIG. 7 emits pattern light to a target area, and FIG. 11B is a diagram illustrating an example of pattern light emitted to the target area.

Referring to the drawings, the optical device may include a light emitting controller 210, a first optical member 230, a second optical member 240, and at least one light emitting unit 220.

The light emitting unit 220 may include a plurality of light emitting elements arranged in a matrix form in an x-axis direction parallel to the base line BL connecting the first light emitting device 200 and the sensor device 400 and a y-axis direction perpendicular thereto.

In this example, the number of light emitting units 220 are two (two rows), and may be arranged adjacent to each other in the y-axis direction. The light emitting elements included in each of the light emitting units R1 and R2 may be grouped into at least one element group, and one element group may be grouped into M sub-element groups. The number of total element groups included in the light emitting unit may be N.

The light emitting controller 210 or the controller 600 may control the element groups (Gr1, Gr2, . . . GrN) included in the light emitting units R1 and R2 to sequentially emit light, and may control the light emitting elements included in the same element group to emit light simultaneously. Each light emitting element may be a point light source in a shape of dot.

The first optical member 230 may be an optical member that converts incident dot-shaped point light sources into a line-shaped pattern light source. The first optical member 230 may generate line-shaped pattern light for each sub-element group of the element group emitting light at a specific time. Accordingly, the number of pattern lights emitted from the first optical member 230 may be the same as the number of sub-element groups included in one element group.

For example, when the light emitting elements included in the first element group Gr1 of the first light emitting unit R1 emit light at a specific time t1, the light incident on the first optical member 230 may be light by M sub-element groups. Each light may be a light in a form in which three dot shaped lights are arranged in a line in the y-axis direction. The first optical member 230 may generate and emit incident light in the shape of three dots into pattern light in the shape of a line. Accordingly, the light emitted from the optical device at a first time t1 may be M first line pattern lights (L_1.1, L_1.2, . . . , L_1.M) spaced apart from each other.

After the light emitting elements included in the first element group Gr1 emit light and are turned off, the light emitting controller 210 or the controller 600 may control the light emitting elements included in the second element group Gr2 to emit light at a second time t2. The second element group Gr2 may be a group of light emitting elements included in the second light emitting unit R2. Since the second light emitting unit R2 is disposed adjacent to the lower end of the first light emitting unit R1, and the first and second light emitting units have a certain width Dd, the second element group Gr2 may be located downward by Dd in the y-axis direction in comparison with the first element group Gr1.

Accordingly, when the light emitting elements included in the second element group Gr2 emit light, the light emitted from the optical device is M second line pattern lights (L_2.1, L_2.2, . . . , L_2.M) spaced apart from each other, and a corresponding line pattern light may be emitted downward by a certain interval Dd' in the y-axis direction, in comparison with the M first line pattern lights (L_1.1, L_1.2, . . . , L_1.M) emitted at t1.

In this case, at the edge of the area where the line pattern light is emitted, the line pattern light may have a sawtooth shape (or a step shape) according to the number of rows of light emitting units. The height H of the sawtooth shape may increase as the number of rows of light emitting units increases. For example, when the number of light emitting units 220 arranged in the y-axis direction is S, the positions of the line pattern lights emitted to a target area may be different by the maximum Dd'*(S−1) distance in the y-axis direction, the height H of the sawtooth shape may be Dd'*(S−1).

The light emitting controller 210 or the controller 600 may control the light emitting elements of all the element groups (Gr1, Gr2, GrN) included in the light emitting unit 220 to sequentially emit light. M line pattern lights may be emitted to the target area at a time over N times, from the first time t1 to the Nth time tn. Accordingly, the line pattern light emitted to the target area may be M*N lights spaced apart from each other.

Since each subgroup included in the light emitting unit 220 is arranged to be spaced apart from each other so that the x-axis coordinates do not overlap, all M*N line pattern lights emitted from the optical device are also spaced apart from each other at a certain interval, and may be irradiated to a target area.

Meanwhile, the total number of line pattern lights emitted from the optical device may be 156. In this case, thirteen line pattern lights may be emitted twelve times at a time. This may be a suitable number when the resolution of the sensor device is HD (1280×720). However, as the resolution of the sensor device increases or decreases, the total number of line pattern lights may increase or decrease accordingly.

The controller 600 may derive depth information of the target area by measuring the parallax distance only for the effective area EA where the sawtooth shape does not appear, excluding the non-effective area NEA in which the emitted line pattern light has a sawtooth shape.

FIGS. 12A to 14 are diagrams for explaining FIG. 11.

FIG. 12A is a diagram illustrating pattern light emitted from the first light emitting device 200 by emitting by the light emitting elements included in the first element group Gr1 at a first time t1. FIG. 12B is a diagram illustrating pattern light emitted from the first light emitting device 200 when the light emitting elements included in the second element group Gr2 emit light at a second time t2, and FIG. 12C is a diagram illustrating a pattern light emitted from the first light emitting device 200 when the light emitting elements included in the Nth element group GrN emit light at a Nth time tn.

Referring to the drawing, when the light emitting elements included in the first element group Gr1 emit light at a first time t1, the first light emitting device 200 emits M first line pattern lights (L_1.1, L_1.2, . . . , L_1.M) to the target area. Each line pattern light may be spaced apart from each other by a certain distance D0.

The distance D0 by which each line pattern light is separated from each other may be greater than or equal to the maximum pixel parallax distance. The maximum pixel parallax distance is a parallax distance measured from a received light pattern reflected by an object located at the closest distance that can be photographed by the first sensor device 400 and/or the second sensor device 500.

When the distance by which the line pattern lights are separated from each other is less than or equal to the maximum pixel parallax distance, the pattern of the received light reflected from the object very close to the optical device may have a parallax distance greater than the distance by which the line patterns are separated from each other. In this case, some patterns of the received light may overlap an area of adjacent line pattern, and the controller 600 may not be able to calculate accurate depth information.

When the light emitting elements included in the first element group Gr1 emit light at a first time t1 of the first line pattern light, the first light emitting device 200 emits M first line pattern lights (L_1.1, L_1.2, . . . , L_1.M) to the target area. Each line pattern light may be spaced apart from each other by a certain distance D0.

The light emitting controller 210 or the controller 600 may control the light emitting unit 220 to sequentially emit the second line pattern light to Nth line pattern light, sequentially from the second time t2 to the Nth time tn, after the first line pattern light is emitted.

FIGS. 13 to 14 are diagrams showing an example of a pattern of a line pattern light and a received light received by the first sensor device 400 and/or the second sensor device 500 by reflecting the line pattern light from a target area.

Referring to the drawings, the received light may be a pattern in which a part of the line pattern is shifted in the x-axis direction in comparison with the pattern of the emitted line pattern light. This is because the depths of the target area to which the emitted pattern light is reflected are different.

The pattern of the received light may be formed of P pixels in the y-axis direction. P may be the same as the number of pixels in the vertical axis of the first sensor device 400 and/or the second sensor device 500.

The controller 600 may calculate the parallax distance (D1_1.1, D2_1.1, D3_1.1, . . . , D3_1.M, D4_1.M) for each pixel by comparing the position of each line pattern of the emitted line pattern light and the position of each line pattern of the received light.

The controller 600 may calculate a parallax distance by calculating a difference between the x coordinates with respect to a pixel having the same y coordinate, among each line pattern of the emitted pattern light and each line pattern of the received light. The controller 600 may calculate a parallax distance for M line patterns of the emitted pattern light, and calculate a parallax distance for P pixels in one line pattern. Accordingly, the controller 600 may calculate a parallax distance for a total of P*M pixels.

The controller 600 may calculate a parallax distance corresponding to each of the first line pattern light to the Nth line pattern light. Accordingly, the controller 600 may calculate a parallax distance for a total of P*(M*N) pixels, and derive depth information of the target area based on the calculated parallax distance.

FIG. 15 is a diagram illustrating another example of a first light emitting device 200 included in the optical device of FIG. 3.

Referring to the drawing, the first light emitting device 200 may include at least one light emitting unit 220. In this example, it is illustrated that the number of light emitting units 220 is N, but the number of light emitting units 220 is not limited thereto, and may be configured in various numbers.

Each of the light emitting units (C1, C2, . . . , and CN) may include a plurality of light emitting elements arranged in a row in the y-axis direction. In addition, each of the light emitting units (C1, C2, . . . , CN) may be arranged adjacent to each other in the x-axis direction. Here, the x-axis direction is a direction parallel to the base line connecting the positions of the first light emitting device 200 and the first sensor device 400 and/or the second sensor device 500. In this example, it is illustrated that one light emitting unit is composed of six light emitting elements, but the number of light emitting elements is not limited thereto, and may be composed of various numbers.

Meanwhile, each of the light emitting units (C1, C2, . . . , CN) may be arranged to be spaced apart by a third distance Dc in the x-axis direction.

FIG. 16 is a diagram illustrating that an optical device including the first light emitting device 200 of FIG. 15 emits pattern light to a target area.

Referring to the drawing, the optical device may include a light emitting controller 210, a first optical member 230, a second optical member 240, and at least one light emitting unit 220.

The light emitting controller 210 or the controller 600 may control the light emitting device 200 so that each light emitting unit (C1, C2, . . . , CN) sequentially emits light, and control the light emitting element included in the same light emitting unit to emit light at the same time. Each light emitting device may be a point light source in a shape of dot.

The first optical member 230 may be an optical member that converts and replicates an incident point light source in a shape of dot into a plurality of spaced pattern light sources in a shape of line. The first optical member 230 may generate incident dot-shaped light emitted from the light emitting unit that emits light at a specific time into a pattern light in a shape of a plurality of lines spaced apart in the x-axis direction.

For example, when the light-emitting elements included in the first light-emitting unit C1 emit light at a specific time t1, the light incident on the first optical member 230 may be light in a form in which six dot shaped lights are arranged in a row in the y-axis direction. The first optical member 230 may generate and emit incident light in the shape of six dots into M pattern lights in the shape of spaced lines. Accordingly, the light emitted from the optical device at the first time t1 may be M first line pattern lights (L_1.1, L_1.2, . . . , L_1.M) spaced apart from each other.

After the light emitting elements included in the first light emitting unit C1 emit light and are turned off, the light emitting controller 210 or the controller 600 may control the light emitting elements included in the second light emitting unit G2 to emit light at a second time t2.

The light emitting controller 210 or the controller 600 may control the light emitting elements included in each of the light emitting units (C1, C2, . . . , and CN) to sequentially emit light. M line pattern lights may be emitted N times at a time to the target area, from the first time t1 to the Nth time tn. Accordingly, the line pattern light emitted to the target area may be M*N lights spaced apart from each other.

Since the light emitting elements included in each light emitting unit (C1, C2, . . . , CN) are arranged spaced apart from each other so that the x-axis coordinates do not overlap, all of the M*N line pattern lights emitted from the optical device may be spaced at certain intervals, and irradiated to the target area.

Since each of the light emitting units (C1, C2, . . . , CN) is arranged side by side in the x-axis direction, a sawtooth shape does not appear in the M*N line pattern lights emitted from the optical device. Accordingly, the controller 600 may set the entire area from which the line pattern light is emitted as an effective area EA, measure the parallax distance, and derive depth information of the target area.

FIGS. 17A to 17C are diagrams for explaining FIG. 16.

FIG. 17A is a diagram illustrating pattern light emitted from the first light emitting device 200, when the light emitting elements included in the first light emitting unit C1 emit light, at a first time t1. FIG. 17B is a diagram illustrating pattern light emitted from the first light emitting device 200, when the light emitting elements included in the second light emitting unit C2 emit light, at a second time t2, and FIG. 17C is diagram illustrating patterned light emitted from the first light emitting device 200, when the light emitting elements included in the N-th light emitting unit CN emit light, at an N-th time tn.

Referring to the drawing, when the light emitting elements included in the first light emitting unit C1 emit light at a first time t1, the first light emitting device 200 emits M first line pattern lights (L_1.1, L_1.2, . . . , L_1.M) to the target area. Each line pattern light may be spaced apart from each other by a certain distance D0.

The light emitting controller 210 or the controller 600 may control the light emitting unit 220 to sequentially emit the second line pattern light to Nth line pattern light, sequentially from the second time t2 to the Nth time tn, after the first line pattern light is emitted.

FIG. 18 is a diagram illustrating an example of an actuator 243 included in the optical device of FIG. 3, and FIG. 19 is an example of line pattern light in which line pattern light generated for each period and line pattern light of all periods are synthesized.

Referring to FIG. 18, the first light emitting device 200 may include a light emitting controller 210, a first optical member 230, a second optical member 240, and at least one light emitting unit 220.

The first light emitting device 200 may further include an actuator 243 which is attached to the first optical member 230 or the second optical member 240 and moves the first optical member 230 and the second optical member 240.

In the drawing, it is shown that the actuator 243 is attached to or included in the second optical member 240, but the actuator 243 may be attached to one side of the first optical member 230, or may be included in the first optical member 230.

The actuator 243 may move the first optical member 230 and the second optical member 240 in parallel in a specific direction. For example, the actuator 243 may move the first optical member 230 and the second optical member 240 in a direction (x-axis direction) parallel to the base line connecting the positions of the first light emitting device 200 and the first sensor device 400 and/or the second sensor device 500

The actuator 243 may include a magnet (not shown) attached to the first optical member 230 or the second optical member 240 and a drive coil (not shown) disposed near the magnet. The drive coil may be fixed to a holder part 244. Meanwhile, the drive coil may be attached to the first optical member 230 or the second optical member 240, and the magnet may be fixed to the holder part 244.

The first optical member 230 and/or the second optical member 240 to which the magnet is attached may be moved by a force generated by applying a coil current to the drive coil. However, the structure of the actuator 243 is not limited thereto, and various driving methods capable of moving an object may be applied.

The controller 600 may sequentially move the actuator 243 in the x-axis direction by a preset distance De. The preset distance De may be smaller than the third distance Dc.

The controller 600 may acquire partial depth information of the target area by controlling the first light emitting device 200 and the first sensor device 400 and/or the second sensor device 500, whenever the actuator 243 moves by a preset distance De, and may acquire depth information of the target area, based on the acquired plurality of partial depth information.

For example, the controller 600 may control the first light emitting device 200 to emit all line pattern lights to the target area during a first period (period 1), and may acquire first partial depth information, based on the pattern of the received light received by the first sensor device 400 and/or the second sensor device 500. The controller 600 may control the actuator 243 to move by a preset distance De, and may acquire second partial depth information during a second period (period 2). As described above, the controller 600 may acquire a plurality of partial depth information over a plurality of periods.

The line pattern light is in a shape of a continuous line in the y-axis direction. However, since the light emitting elements included in the light emitting unit 220 are spaced apart from each other by a third distance Dc in the x-axis direction, the line pattern lights emitted to the target area are spaced apart by a certain distance Dc' in proportion to the third distance. Accordingly, the depth information calculated based on the line pattern lights may have a high resolution in the y-axis direction, but may have a relatively low resolution in the x-axis direction.

In each period, the x-coordinates of the line pattern light emitted to the target area may all be different. In comparison with the line pattern light (FIG. 19(a)) emitted to the target area during a first period, the line pattern light (FIG. 19(b)) emitted to the target area during a second period may have a form that has moved by De' in the x-axis direction. Likewise, the line pattern light (FIGS. 19(c) and (d)) emitted during a third period and a fourth period may have a form that has moved by 2*De' and 3*De' in the x-axis direction.

The controller 600 may acquire depth information of a target area by merging a plurality of partial depth information. Accordingly, it is possible to increase the horizontal resolution (resolution in the x-axis direction) of the depth information of the target area, and increase the accuracy of the depth information.

As described above, an optical device according to an embodiment of the present disclosure, and a camera device and an electronic apparatus having the same may acquire depth information of a target area by using a plurality of line pattern lights spaced apart from each other, thereby reducing the amount of calculation for acquiring depth information.

In addition, an optical device according to an embodiment of the present disclosure, and a camera device and an electronic apparatus having the same may minimize the size of a light emitting device, when the light emitting device includes at least one light emitting unit including light emitting elements which are arranged in a plurality of groups.

In addition, an optical device according to an embodiment of the present disclosure, and a camera device and an electronic apparatus having the same may reduce power consumption of a light emitting device, when the light emitting device includes a vertical cavity surface emitting laser and a light conversion optical member.

In addition, an optical device according to an embodiment of the present disclosure, and a camera device and an electronic apparatus having the same may acquire depth information while moving the position of a first optical member through an actuator, thereby increasing the resolution and accuracy of the depth information.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical device comprising:
a first light emitting device configured to emit a first plurality of line pattern light, spaced apart from each other by a first distance, to a target area;
at least one sensor device configured to detect a received light, which is the first plurality of emitted line pattern light, that is reflected from the target area; and
a controller configured to calculate a parallax distance from a pattern of the detected received light, and acquire depth information of the target area by using the calculated parallax distance, wherein the first light emitting device comprises:

at least one light emitting unit including at least one light emitting element and configured to emit light of a specific wavelength; and a first optical member configured to generate light emitted from the at least one light emitting unit into at least one line pattern light, wherein the sensor device comprises an asynchronous type sensor device or a frame type sensor device for sensing pixel-based data, and wherein the controller is further configured to:

control the sensor device so that the sensor device operates in synchronization with a point of time when the light emitting element emits light, control the first light emitting device to emit a same number of a second plurality of line pattern light to the target area during each of a plurality of sequential time periods, wherein for each of the plurality of sequential time periods, each of the second plurality of line pattern light is spaced at a same second distance, relative to a preceding emission of an adjacent one of the second plurality of line pattern light, and wherein the second distance is less than the first distance at which the first plurality of line pattern light are spaced apart from each other, control the at least one sensor device to detect further received light, which is the second plurality of line pattern light, for each of the plurality of sequential time periods, that is reflected from the target area, acquire partial depth information of the target area based on the further received light, and acquire further depth information of the target area, based on the acquired partial depth information.

2. A camera comprising an optical device;

wherein the optical device comprises:

a first light emitting device configured to emit a first plurality of line pattern light, spaced apart from each other by a first distance, to a target area;

at least one sensor device configured to detect a received light, which is the first plurality of emitted line pattern light, that is reflected from the target area; and a controller configured to calculate a parallax distance from a pattern of the detected received light, and acquire depth information of the target area by using the calculated parallax distance, wherein the first light emitting device comprises:

at least one light emitting unit including at least one light emitting element and configured to emit light of a specific wavelength; and a first optical member configured to generate light emitted from the at least one light emitting unit into at least one line pattern light, wherein the sensor device comprises an asynchronous type sensor device or a frame type sensor device for sensing pixel-based data, and wherein the controller is further configured to:

control the sensor device so that the sensor device operates in synchronization with a point of time when the light emitting element emits light, control the first light emitting device to emit a same number of a second plurality of line pattern light to the target area during each of a plurality of sequential time periods, wherein for each of the plurality of sequential time periods, each of the second plurality of line pattern light is spaced at a same second distance, relative to a preceding emission of an adjacent one of the second plurality of line pattern light, and wherein the second distance is less than the first distance at which the first plurality of line pattern light are spaced apart from each other, control the at least one sensor device to detect further received light, which is the second plurality of line pattern light, for each of the plurality of sequential time periods, that is reflected from the target area, acquire partial depth information of the target area based on the further received light, and acquire further depth information of the target area, based on the acquired partial depth information.

* * * * *